United States Patent
Simpson et al.

(10) Patent No.: US 11,049,161 B2
(45) Date of Patent: Jun. 29, 2021

(54) BRAND-BASED PRODUCT MANAGEMENT WITH BRANDING ANALYSIS

(71) Applicant: Mimeo.com, Inc., New York, NY (US)

(72) Inventors: James P. Simpson, Boston, MA (US); David Jacques Uyttendaele, New York, NY (US); Craig Jacobs, Patterson, NY (US)

(73) Assignee: Mimeo.com, Inc., New York, NY (US)

( * ) Notice: Subject to any disclaimer, the term of this patent is extended or adjusted under 35 U.S.C. 154(b) by 186 days.

(21) Appl. No.: 15/186,942

(22) Filed: Jun. 20, 2016

(65) Prior Publication Data
US 2017/0364981 A1    Dec. 21, 2017

(51) Int. Cl.
| | |
|---|---|
| G06Q 30/06 | (2012.01) |
| H04L 29/08 | (2006.01) |
| G06F 16/951 | (2019.01) |
| G06F 40/103 | (2020.01) |
| G06F 40/109 | (2020.01) |
| G06F 40/186 | (2020.01) |

(52) U.S. Cl.
CPC ....... *G06Q 30/0621* (2013.01); *G06F 16/951* (2019.01); *G06F 40/103* (2020.01); *G06F 40/109* (2020.01); *G06F 40/186* (2020.01); *G06Q 30/0643* (2013.01); *H04L 67/02* (2013.01)

(58) Field of Classification Search
CPC .. G06F 17/211; G06F 17/214; G06F 17/2247; G06F 17/227; G06F 17/2288; G06F 17/30864; G06F 16/951; G06F 40/109; G06F 40/103; G06F 40/186; G06Q 30/0621; G06Q 30/0643; H04L 67/02
USPC .................. 715/201, 204, 234, 235
See application file for complete search history.

(56) References Cited

U.S. PATENT DOCUMENTS

| | | | | |
|---|---|---|---|---|
| 8,717,619 | B2 * | 5/2014 | Jacobs | G06K 15/027 |
| | | | | 358/1.9 |
| 8,996,538 | B1 * | 3/2015 | Cremer | G06F 16/70 |
| | | | | 707/749 |
| 9,041,729 | B1 * | 5/2015 | Stahl | G06T 11/20 |
| | | | | 345/619 |
| 2003/0195802 | A1 * | 10/2003 | Hensen | G06Q 30/02 |
| | | | | 705/14.4 |

(Continued)

FOREIGN PATENT DOCUMENTS

WO    2008100975 A2    8/2008

OTHER PUBLICATIONS

Extract; Jun. 9, 2016, Dictionary.com; pp. 1-8.*

(Continued)

*Primary Examiner* — Andrew R Dyer
(74) *Attorney, Agent, or Firm* — LaBatt, LLC

(57) ABSTRACT

A solution for managing branding for an entity is provided. The solution can generate a brand style guide by analyzing electronic entity identity resources, which are representative of one or more branding strategies for the entity. The analysis can include extracting entity brand attributes from each electronic entity identity resource. Illustrative entity brand attributes can include one or more of: image data, font data, color data, or text. An ad hoc style guide, which can include at least one branding strategy for the entity can be generated and provided for presentation to a user.

20 Claims, 10 Drawing Sheets

(56) References Cited

U.S. PATENT DOCUMENTS

| | | | |
|---|---|---|---|
| 2004/0003347 A1* | 1/2004 | Saidenberg | G06F 17/24 715/255 |
| 2005/0152344 A1* | 7/2005 | Chiu | H04M 3/4938 370/352 |
| 2006/0229882 A1* | 10/2006 | Stemmle | G06F 40/103 704/277 |
| 2008/0065792 A1 | 3/2008 | Wu et al. | |
| 2008/0144065 A1* | 6/2008 | Jacobs | G06F 3/1204 358/1.13 |
| 2008/0174821 A1 | 7/2008 | Singh et al. | |
| 2009/0144325 A1* | 6/2009 | Chastagnol | G06Q 30/06 |
| 2009/0254399 A1* | 10/2009 | Cristol | G06Q 30/02 705/7.36 |
| 2010/0125562 A1* | 5/2010 | Nair | G06F 16/958 707/709 |
| 2011/0145055 A1* | 6/2011 | Tobin | G06Q 30/02 705/14.39 |
| 2011/0145072 A1* | 6/2011 | Christiansen | G06Q 30/02 705/14.66 |
| 2012/0047219 A1* | 2/2012 | Feng | G06F 16/2465 709/207 |
| 2012/0198368 A1 | 8/2012 | Bornheimer et al. | |
| 2012/0246302 A1* | 9/2012 | Lafleur | G06Q 30/02 709/224 |
| 2012/0278413 A1* | 11/2012 | Walsh | H04L 51/14 709/206 |
| 2012/0303516 A1* | 11/2012 | Fellig | G06Q 20/10 705/39 |
| 2013/0086677 A1* | 4/2013 | Ma | G06F 17/3089 726/22 |
| 2013/0215116 A1* | 8/2013 | Siddique | G06Q 20/204 345/420 |
| 2013/0282808 A1* | 10/2013 | Sadanandan | G06Q 10/10 709/204 |
| 2013/0325437 A1* | 12/2013 | Lehman | G06F 40/30 704/9 |
| 2013/0332475 A1* | 12/2013 | Michelstein | G06F 16/23 707/756 |
| 2014/0006327 A1* | 1/2014 | Kaplinger | G06Q 30/02 706/46 |
| 2014/0025619 A1* | 1/2014 | Michelstein | G06F 16/26 706/47 |
| 2014/0025650 A1* | 1/2014 | Lee | G06F 40/131 707/694 |
| 2014/0207521 A1* | 7/2014 | Onder | G06Q 30/0203 705/7.32 |
| 2015/0142586 A1* | 5/2015 | Schulz | G06F 17/274 705/14.73 |
| 2016/0162500 A1* | 6/2016 | Wilson | G06F 16/958 715/234 |

OTHER PUBLICATIONS

"Application programming interface;" Microsoft Computer Dictionary; May 1, 2002; Microsoft Press; Fifth Edition; p. 33.*

"Or;" Merriam-Webster; Nov. 28, 2016; merriam-webster.com; 10 Pages.*

"Tone;" Mar. 11, 2016; merriam-webster.com; pp. 1-8.*

"Mood;" Mar. 4, 2016; merriam-webster.com; pp. 1-7.*

Bello, M., International Application No. PCT/US2017/038250, "International Search Report and Written Opinion," dated Sep. 22, 2017, 14 pages.

"5 Tools to Analyze a Website's Design—Designer Daily: Graphic and Web Design Blog," Apr. 27, 2017, 10 pages, Retrieved from http://www.designer-daily.com/5-tools-to-analyze-awebsites-design-52711, Retrieved on Aug. 30, 2017.

Frontify, "Frontify Tutorial: How to Create a Style Guide?" YouTube, Feb. 4, 2016, 4 pages, Retrieved from https://www.youtube.com/watch?v-nCmrtHCs6Rc, Retrieved on Sep. 1, 2017.

Mrowetz, M., "GitHub—micmro/Stylify-Me: Website Style Analyzer for Designers," Aug. 31, 2015, 2 pages, Retrieved from https://github.com/micmro/Stylify-Me, Retrieved on Aug. 30, 2017.

"Stylify Me—Online Style Guide Generator," Aug. 31, 2015, 4 pages, Retrieved from http://stylifyme.com/?stylify=www.epo.org/, Retrieved on Aug. 30, 2017.

"Color Supply," Design by Numbers, http://colorsupplyy.com/, 3 pages, printed Jun. 10, 2016.

* cited by examiner

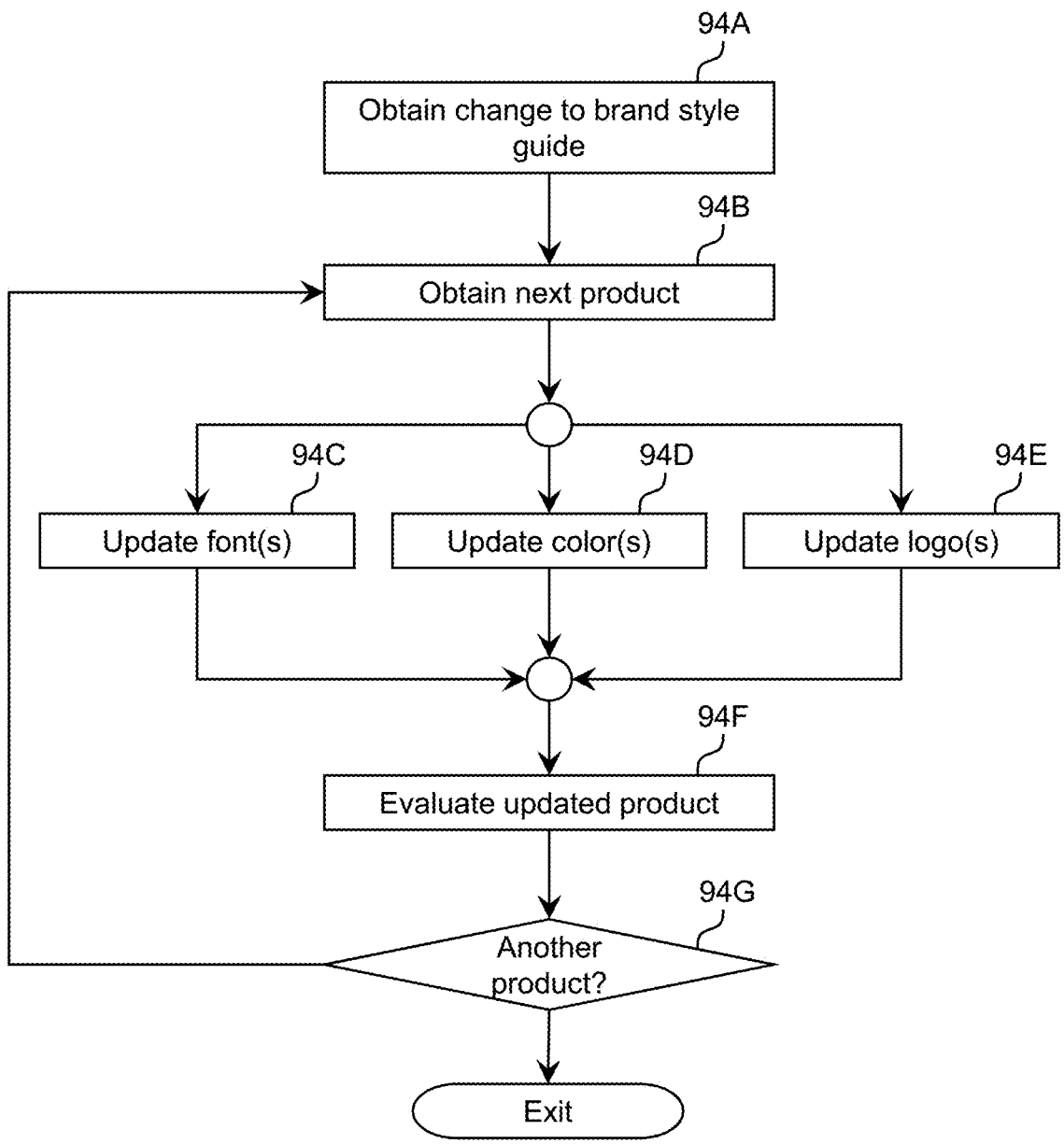

BRAND-BASED PRODUCT MANAGEMENT WITH BRANDING ANALYSIS

TECHNICAL FIELD

The disclosure relates generally to customization of products, and more particularly, to providing brand-based customization of products.

BACKGROUND ART

Software applications often enable a user to define a customized interface or "skin." Currently, a user must step through a protracted process of entering multiple color values, font settings, and other related parameters to define the customized interface. Various websites offer custom branding as part of their services. However, the tools typically yield either a result which is very basic and inflexible, or one that is extremely robust but very complex to operate.

SUMMARY OF THE INVENTION

Aspects of the invention provide a solution for managing branding for an entity. The solution can generate a brand style guide by analyzing electronic entity identity resources, which are representative of one or more branding strategies for the entity. The analysis can include extracting entity brand attributes from each electronic entity identity resource. Illustrative entity brand attributes can include one or more of: image data, font data, color data, or text. An ad hoc style guide, which can include at least one branding strategy for the entity can be generated and provided for presentation to a user. The brand style guide can be utilized in various ways to create new entity products, evaluate existing entity products, update existing entity products, etc.

A first aspect of the invention provides a computer-implemented method of managing branding for an entity, the method comprising: generating a brand style guide on a computer system, wherein the generating includes: the computer system identifying a set of electronic entity identity resources representative of at least one brand for the entity; the computer system extracting entity brand attributes from each electronic entity identity resource in the set of electronic entity identity resources, wherein the extracting includes extracting at least one of: image data, font data, color data, or text, from the electronic entity identity resource; the computer system automatically generating an ad hoc style guide for the entity using the extracted entity brand attributes, wherein the ad hoc style guide includes at least one branding strategy for the entity; and the computer system providing the ad hoc style guide for presentation to a user.

A second aspect of the invention provides a computer system for managing branding for an entity, the computer system comprising: a set of computing devices configured to generate a brand style guide by performing a process including: identifying a set of electronic entity identity resources representative of at least one brand for the entity; extracting entity brand attributes from each electronic entity identity resource in the set of electronic entity identity resources, wherein the extracting includes extracting at least one of: image data, font data, color data, or text, from the electronic entity identity resource; automatically generating an ad hoc style guide for the entity using the extracted entity brand attributes, wherein the ad hoc style guide includes at least one branding strategy for the entity; and providing the ad hoc style guide for presentation to a user.

A third aspect of the invention provides a computer system for managing branding for an entity, the computer system comprising: a set of computing devices configured to generate a brand style guide by extracting entity brand attributes from a set of electronic entity identity resources in the set of electronic entity identity resources, and generating the brand style guide for the entity using the extracted entity brand attributes, wherein the brand style guide includes at least one branding strategy for the entity; and a set of computing devices configured to manage entity products for the entity using the brand style guide, wherein the managing includes enabling a third party user system to utilize data corresponding to the brand style guide and evaluating entity products for compliance with the brand style guide.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 10 shows an illustrative process for updating a set of entity products to align with a branding style guide according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
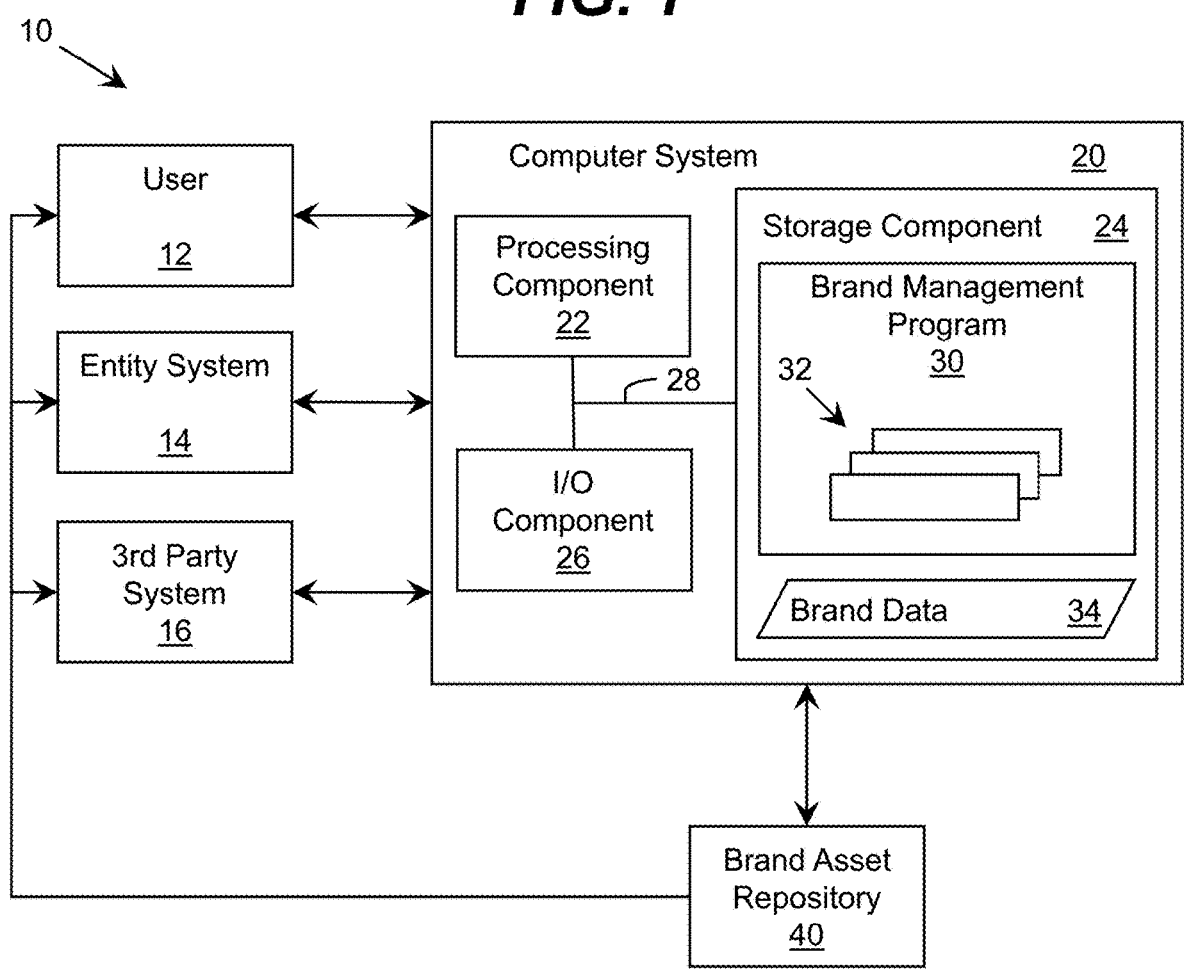
FIG. 1 shows an illustrative environment for managing branding for an entity according to an embodiment.

As indicated above, aspects of the invention provide a solution for managing branding for an entity. The solution can generate a brand style guide by analyzing electronic entity identity resources, which are representative of one or more branding strategies for the entity. The analysis can include extracting entity brand attributes from each electronic entity identity resource. Illustrative entity brand attributes can include one or more of: image data, font data, color data, or text. An ad hoc style guide, which can include at least one branding strategy for the entity can be generated and provided for presentation to a user. The brand style guide can be utilized in various ways to create new entity products, evaluate existing entity products, update existing entity products, etc. As used herein, unless otherwise noted, the term "set" means one or more (i.e., at least one) and the phrase "any solution" means any now known or later developed solution.

Embodiments described herein can provide a solution to the technical problem of defining and/or creating products for an entity utilizing a consistent branding for the entity. A significant barrier to use of a consistent branding is the lack of an automated or semi-automated solution for identifying and/or enforcing the branding for the entity. To this extent, embodiments can provide a solution that generates a brand asset repository, which includes various assets that can be utilized to improve the manner in which a computer system can enforce use of a desired branding for the entity while products for the entity are defined and/or created. In a particular embodiment, the brand asset repository is generated using a semi-automated or automated solution, which does not require that the entity have a pre-existing, defined branding strategy.

As used herein, an entity can be any person, group of people, association, business, governmental unit, and/or the like, which would like to develop and/or implement a consistent brand in the electronic and/or physical products that are produced by the entity. As also used herein, branding includes the use of any combination of various attributes in a consistent manner on entity-related products. For example, the attributes can include any combination of: a color scheme, a font, font size, paragraph style, logo(s), trademark(s)/service mark(s), and/or the like. Additionally, attributes can include arrangement attributes, which define a consistent location and/or inclusion of certain content within at least certain types of the entity-related products. Illustrative arrangement attributes include: placement and/or size of a logo, use and/or content of footers and/or headers, inclusion and/or content of contact information, and/or the like.

While a branding strategy can provide a single, uniform group of attributes, it is understood that an entity may utilize multiple branding strategies, each of which has a unique combination of attributes. For example, an entity may utilize distinct branding strategies for different types of products, different times of year, different target audiences, different target platforms, and/or the like. To this extent, an embodiment of the computer system 20 can provide for the utilization of an appropriate branding strategy from multiple branding strategies, which can be selected according to the product on which the branding is applied.

As used herein, a product includes any item, electronic or physical, made by or on behalf of an entity. Illustrative electronic products include brochures, marketing material, user manuals, webpages, and/or the like. Illustrative physical products include brochures, marketing material, user manuals, custom-branded items (e.g., give away items, products sold by the entity), uniforms, product packaging, and/or the like. As also used herein, a resource comprises a product or a definition of a product (e.g., a specification for a custom-branded item) that is used in defining or updating the branding for an entity.

Turning to the drawings, FIG. 1 shows an illustrative environment 10 for managing branding for an entity according to an embodiment. To this extent, the environment 10 includes a computer system 20 that can perform a process described herein in order to manage branding for the entity. In particular, the computer system 20 is shown including a brand management program 30, which makes the computer system 20 operable to manage branding for the entity by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the brand management program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 to communicate with the computer system 20 using any type of communications link. To this extent, the brand management program 30 can manage a set of interfaces (e.g., graphical user interface(s), application program interface(s), and/or the like) that enable human and/or system users 12 to interact with the brand management program 30. Furthermore, the brand management program 30 can manage (e.g., store, retrieve, create, manipulate, organize, present, etc.) the data, such as brand data 34, using any solution.

In any event, the computer system 20 can comprise one or more general purpose computing articles of manufacture (e.g., computing devices) capable of executing program code, such as the brand management program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the brand management program 30 can be embodied as any combination of system software and/or application software.

Furthermore, the brand management program 30 can be implemented using a set of modules 32. In this case, a module 32 can enable the computer system 20 to perform a set of tasks used by the brand management program 30, and can be separately developed and/or implemented apart from other portions of the brand management program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the brand management program 30 fixed thereon (e.g., one or more modules 32). However, it is understood that the computer system 20 and the brand management program 30 are only representative of various possible equivalent computer systems that may perform a process described herein. To this extent, in other embodiments, the functionality provided by the computer system 20 and the brand management program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the brand management program 30 enables the computer system 20 to manage branding for an entity by performing a process described herein. In an embodiment, the computer system 20 can manage a brand asset repository 40, which can include any combination of various assets, such as tools, templates, style sheets, and/or the like, which can be utilized in the development of entity-related products. As described herein, the computer system 20 can generate and/or modify the brand data 34 and/or the brand asset repository 40 based on input provided by a user 12 (e.g., an authorized user associated with the entity), an entity system 14, a third party system 16, and/or the like. Furthermore, the brand asset repository 40 can be utilized by the user 12, the entity system 14, the third party system 16, and/or the like, when generating entity-related products.

As used herein, the entity system 14 can comprise any computer system on which entity-related products are stored and/or created by the entity. For example, the entity system 14 can comprise a web server, which hosts various webpages and/or other electronic products, e.g., for distribution to the public. Furthermore, the entity system 14 can comprise an internal computer system, on which various entity-related products are created. To this extent, the internal computer system can be utilized by one or more marketing users, technical document writers, and/or the like.

The third party system 16 can comprise any computer system including information regarding the entity and/or creating entity-related products on behalf of the entity. For example, the third party system 16 can comprise a proprietary or public database including information on various companies. Illustrative third party systems 16 include private business databases, such as Dunn & Bradstreet (D&B), Hoovers, Crunchbase, and/or the like. Third party systems 16 also can include government databases (e.g., federal, state, and/or international), such as business entity listings, registered trademarks, and/or the like. Still further, the third party system 16 can comprise a computer system utilized by a third party, which is creating entity-related products on behalf of the entity. Such a third party can be a printing service, a custom fabricator, and/or the like.

Figure 2:
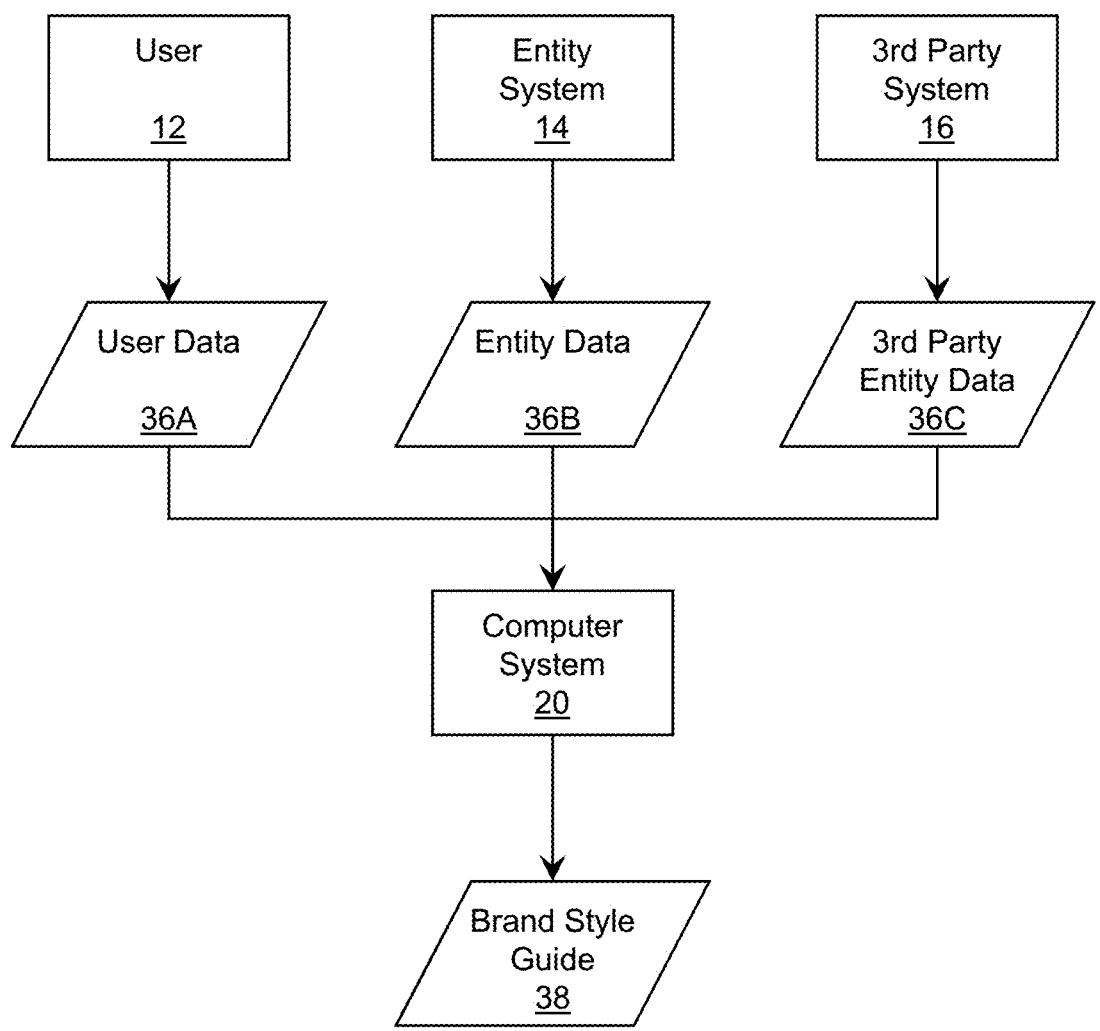
FIG. 2 shows an illustrative flow diagram for generating a brand style guide according to an embodiment.

An embodiment of the computer system 20 can automatically or semi-automatically generate a brand style guide for the entity, which can be stored as an asset in the brand asset repository 40, and can be subsequently used in generating one or more additional assets in the brand asset repository 40. FIG. 2 shows an illustrative flow diagram for generating a brand style guide 38 according to an embodiment. In this case, the computer system 20 can extract information regarding the branding of an entity from various resources. Such a solution can be useful, for example, when the entity does not have a readily available pre-defined branding specification. As illustrated, the computer system 20 can obtain any combination of various types of data from any combination of various sources, which the computer system 20 can utilize to generate the brand style guide 38. The brand style guide 38 can store the data using any solution (e.g., a database, a formatted file, a collection of files, etc.).

For example, the computer system 20 can obtain user data 36A from a user 12. The user data 36A can include, for example, an electronic entity resource, such as an image file (e.g., including an electronic logo), a marketing document, and/or the like. Additionally, the user data 36A can include information regarding the location of one or more electronic entity resources from which the computer system 20 can retrieve electronic entity resource(s). Such information can include a publicly accessible universal resource locator (URL) address, a privately accessible location (e.g., login and location information for a private network), etc. The user data 36A also can include information regarding one or more attributes of the entity brand, such as a font, a color scheme, key words and/or phrases (e.g., including trade name, trademarks, service marks, slogans, etc.), audio (e.g., a sound mark), image(s), video (e.g., an animation), and/or the like.

Similarly, the computer system 20 can obtain entity data 36B from an entity system 14. The entity data 36B can include any combination of various types of electronic entity resources as described herein. In an embodiment, the computer system 20 uses user data 36A to identify and/or automatically obtain some or all of the entity data 36B. For example, the computer system 20 can use login information provided in user data 36A to access and obtain entity data 36B from a private data storage location and/or network. Furthermore, the computer system 20 can automatically identify one or more publicly accessible locations including entity data 36B. For example, the computer system 20 can conduct a search of all publicly or privately accessible top level domains, and acquire entity data 36B from one or more of the domains. Regardless, the data locations can be accessed via any type of network, such as the Internet, an intranet, an extranet, a virtual private network, and/or the like. Similarly, the data can be stored on a computer system maintained by the entity or a third party on behalf of the entity (e.g., a file hosting and/or sharing service, a web hosting service, and/or the like).

Furthermore, the computer system 20 can obtain third party entity data 36C from one or more third party systems 16. The third party entity data 36C can include any of various types of information generated by a third party regarding the entity. The third party system 16 can be a public (e.g., state, local, or federal government) system or a private (e.g., business registry or research service) system. In either case, the computer system 20 can utilize login credentials, if necessary, to access and obtain the third party entity data 36C from the third party system 16. The computer system 20 can use an automated solution for acquiring third party entity data 36C from a third party system 16, e.g., via a script, an API, a Web crawler, and/or the like. Regardless, the third party entity data 36C can include any of various types of data regarding the entity, such as public filings (e.g., business registrations, trademark registrations, public company filings, etc.), public announcements (e.g., product announcements, company announcements, etc.), business information (e.g., size, location, primary business, etc.), and/or the like. In an embodiment, similar to the user data 36A, the computer system 20 can utilize third party entity data 36C to identify and/or automatically obtain some or all of the entity data 36B.

In any event, the computer system 20 can process the data 36A-36C to generate a brand style guide 38 for the entity using a process described herein. The brand style guide 38 can include at least one branding strategy for the entity, which the computer system 20 can generate from the data 36A-36C. A branding strategy can include various data for use in products relating to the entity. Such data can include visual presentation information, such as a font, a color scheme, imagery, logos, layout, and/or the like. Additionally, the branding strategy data can include data relating to phrasing consistent with the branding strategy, which can be utilized in presenting the data. Such data can include keywords, phrases, a mood, a tone, and/or the like. Still further, the branding strategy can include audiovisual data for use in conjunction with electronic products, such as one or more audio files, one or more video files, and/or the like.

Figure 3:
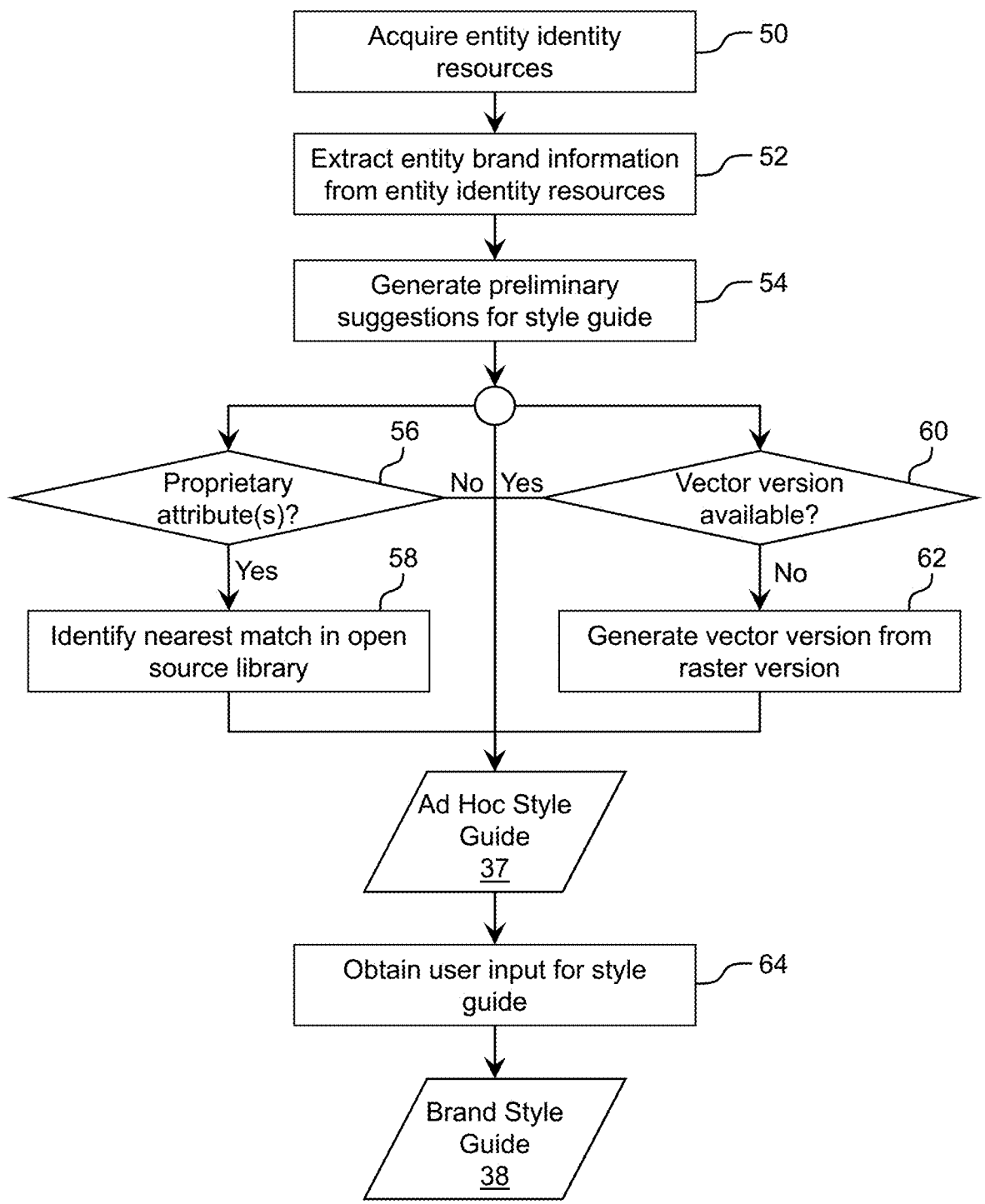
FIG. 3 shows an illustrative process for generating a brand style guide according to an embodiment.

FIG. 3 shows an illustrative process, which can be implemented by the computer system 20 (FIG. 1), for generating a brand style guide 38 (FIG. 2) according to an embodiment. In this case, the computer system 20 can automatically generate an ad hoc style guide 37, which can be used to create the brand style guide 38. Similar to the brand style guide 38, the ad hoc style guide 37 can include data corresponding to one or more branding strategies for the entity. Additionally, the ad hoc style guide 37 can include one or more suggestions, replacements, alternatives, and/or the like, for altering and/or enhancing a branding strategy created based on the data in various entity resources. The ad hoc style guide 37 can be refined with input from one or more users to create the brand style guide 38.

In action 50, the computer system 20 can acquire one or more entity identity resources representative of one or more branding strategies for the entity using any solution. As used herein, an entity identity resource can comprise any electronic data that is suitable for use in generating a brand style guide 38 for the entity. In an embodiment, the computer system 20 acquires one or more entity identity resources in one or more types of the entity data 36A-36C described herein. In a further embodiment, the computer system 20 can prioritize the entity data 36A-36C based on a determined importance of the entity data 36A-36C to developing an overall brand for an entity.

Figure 4:
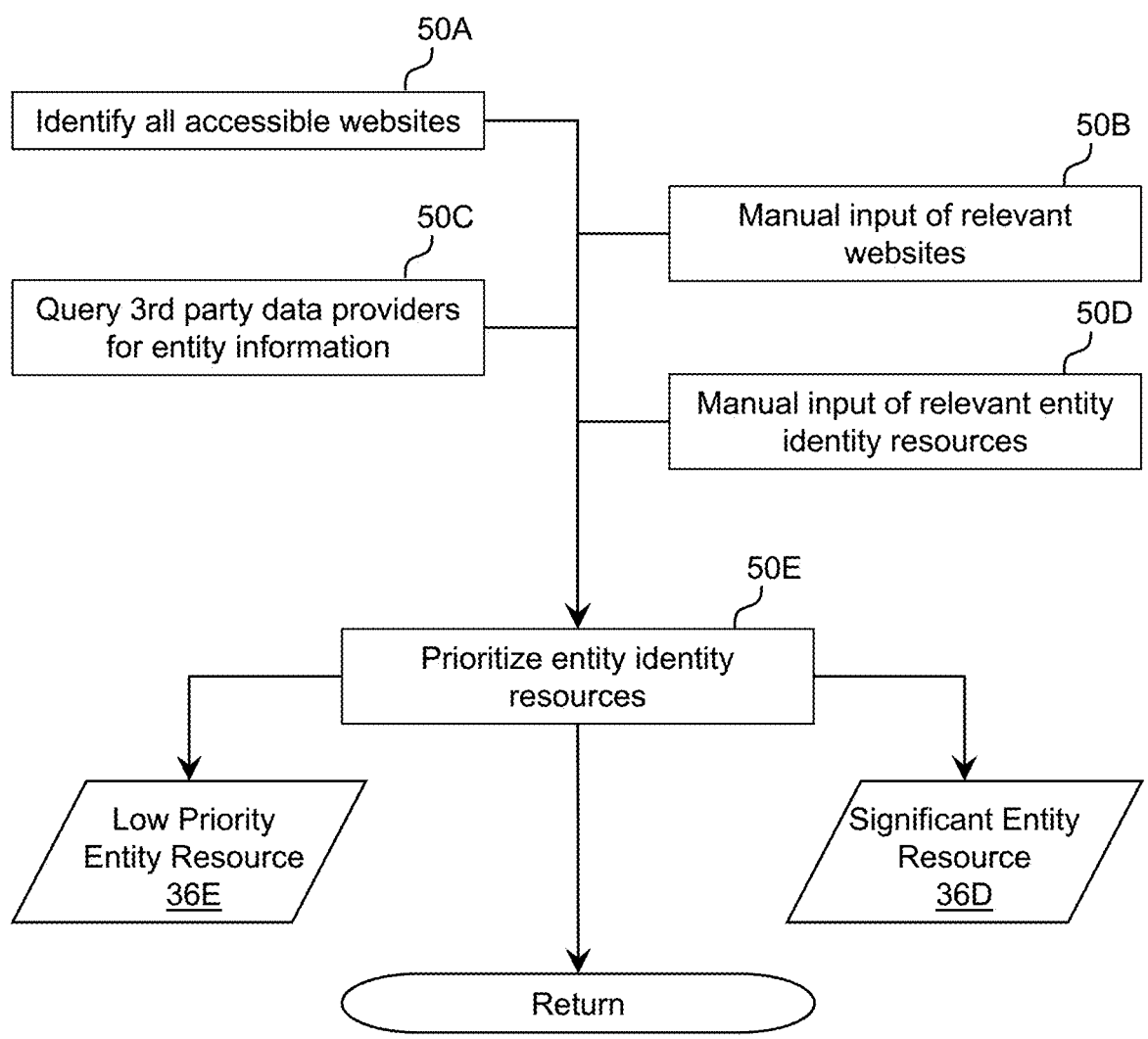
FIG. 4 shows an illustrative process for obtaining and prioritizing entity data according to an embodiment.

FIG. 4 shows an illustrative process, which can be implemented by the computer system 20 (FIG. 1), for obtaining and prioritizing entity data 36A-36C according to an embodiment. For example, the brand management program 30 (FIG. 1) can include a query module, which is configured to perform the process shown in FIG. 4 when executed by the computer system 20. While FIG. 4 is primarily directed to accessing information available on webpages and websites accessed via the Internet, it is understood that the process can be implemented in other contexts with other types of data source locations, such as a private network, an alternative public network, and/or a combination of public and private networks.

Regardless, in action 50A, the computer system 20 can automatically identify all accessible websites relating to the entity using any solution. For example, the computer system 20 can generate a set of potential domain names from data for the entity (e.g., the entity name) and a group of top-level domain suffixes (e.g., .com, .net, .org, .co, etc.), and attempt to access each such domain to determine whether a relevant website is available under the domain name. Additionally, the computer system 20 can obtain known websites from third party databases including information on the entity, domain information included in email addresses, domains included in search results for the entity name provided by an Internet search engine, and/or the like. In action 50B, the computer system 20 can receive data identifying one or more websites relating to the entity from a user, such as the user 12 (FIG. 1), using any solution (e.g., a manual prompt).

Each website identified in actions 50A, 50B can comprise a website for which the content is directly managed by the entity or is managed on behalf of the entity. A website can be located under any top level domain. In an embodiment, the computer system 20 can prioritize a list of websites identified in actions 50A, 50B using any solution. For example, the user 12 can review the list and indicate an order of importance for each website. Additionally, the computer system 20 can prioritize the websites according to the source(s) of the information. For example, a website provided by the user 12 or identified in the entity data, such as an email address, can have a high importance, while a website only identified in search results provided by a search engine can have a low importance. Additionally, the computer system 20 can exclude one or more websites included in a preliminary list of websites. For example, the user 12 can review the list of websites automatically identified and remove any websites that are not relevant. Additionally, a website only identified in search engine results can be excluded when one or more other websites have been identified as such a website may be erroneously identified.

Each relevant website can include one or more webpages comprising entity identity resources, which the computer system 20 can automatically identify using any solution. For example, the home page can comprise an entity identity resource as it is the first page presented to users when they access the website without specifying any particular portion of the website. In an embodiment, the computer system 20 includes a database (e.g., dictionary) of keywords and/or phrases, which the computer system 20 can utilize to identify entity identity resources located at a website. For example, the computer system 20 can analyze the content, the URL, metadata, and/or the like, of a webpage to determine whether a particular webpage matches any of the keywords and/or phrases. If so, the computer system 20 can identify the webpage as an entity identity resource. Illustrative keywords and phrases, which can be utilized include, for example, "about us," "press kit," "downloads," "resources," etc., each of which can be used to characterize the corresponding web page as an entity identity resource.

In action 50C, the computer system 20 can obtain entity information from one or more third party data providers using any solution. For example, the computer system 20 can send a query regarding the entity to a third party system 16 (FIG. 1), which can respond with information regarding the entity that is stored in its database. For example, as described herein, illustrative third party systems 16 include private business databases, government databases, and/or the like. The query can utilize an application program interface (API) service for the third party system 16, which enables the computer system 20 to generate requests and receive data in a standardized format. Alternatively, the computer system 20 can access content exposed by the third party system 16 via a particular URL, and/or the like. Regardless, the computer system 20 can generate an entity identity resource based on the data received from the third party system 16, which can be stored as brand data 34 (FIG. 1).

In action 50D, the computer system 20 can receive data corresponding to an entity identity resource from a user 12. For example, the data can include a URL for accessing a particular entity identity resource, a copy of the entity identity resource, and/or the like. In an embodiment, the computer system 20 can generate an interface for presentation to the user 12 which includes all entity identity resources identified in actions 50A-50C. The user 12 can use the interface to selectively add and/or remove entity identity resources to be utilized. For example, the computer system 20 may obtain an entity identity resource generated with a previous branding solution, which is no longer being utilized by the entity. Similarly, the entity may be transitioning to a new branding style, which is not yet available on publicly accessible websites. In this case, the user 12 can provide the computer system 20 with access to and/or copies of at least a portion of the entity identity resources to be utilized.

In action 50E, the computer system 20 can prioritize the various entity identity resources obtained during actions 50A-50D. The computer system 20 can assign relative priorities using any solution. For example, entity identity resources obtained from a key webpage of a website or provided by the user 12, can be ranked as a higher priority, while entity identity resources obtained from third parties and less important webpages of a website can be ranked as a lower priority. In an embodiment, the computer system 20 can determine the relative priority of comparable resources (e.g., resources obtained from the same website) by analyzing the text for inclusion of key terms. These terms can include headings, document name, titles, and/or the like. A webpage including a key term in a more prominent location and/or more key terms can be ranked higher than a webpage including fewer and/or less prominent key terms.

In an embodiment, the computer system 20 can generate two or more indexes of entity identity resources. For example, the computer system 20 can generate an index with significant entity identity resources 36D and an index with low priority entity identity resources 36E. During subsequent processing, the computer system 20 can use the significant entity identity resources 36D to extract brand information regarding the entity and the low priority entity identity resources 36E to confirm the brand information, supplement the brand information (e.g., with image data), fill in gaps remaining in the brand information (e.g., access a better quality logo), and/or the like.

It is understood that while the process shown in FIG. 4 illustrates the various actions being sequentially performed, the computer system 20 can perform the actions in any order, including concurrently. Additionally, it is understood that the actions can be performed multiple times and/or in an iterative manner until the computer system 20 comprises suitable entity identity resources for use in generating a brand style guide. Regardless, at the completion of the process, the computer system 20 can continue with generating the brand style guide 38 as shown in FIG. 3.

In action 52 shown in FIG. 3, the computer system 20 can extract entity brand information from the entity identity resources. In particular, the computer system 20 can process each entity identity resource (e.g., the significant entity identity resources 36D and the lower priority entity identity resources 36E) and extract information relating to the brand of the entity using any solution. For example, the computer system 20 can extract one or more of: a logo, a typeface, information attributes (e.g., document type or purpose), a color scheme, image(s), audio, video, and/or the like, from the entity identity resource 36D-36E, which can be utilized in developing or determining a brand corresponding to the entity.

Figure 5:
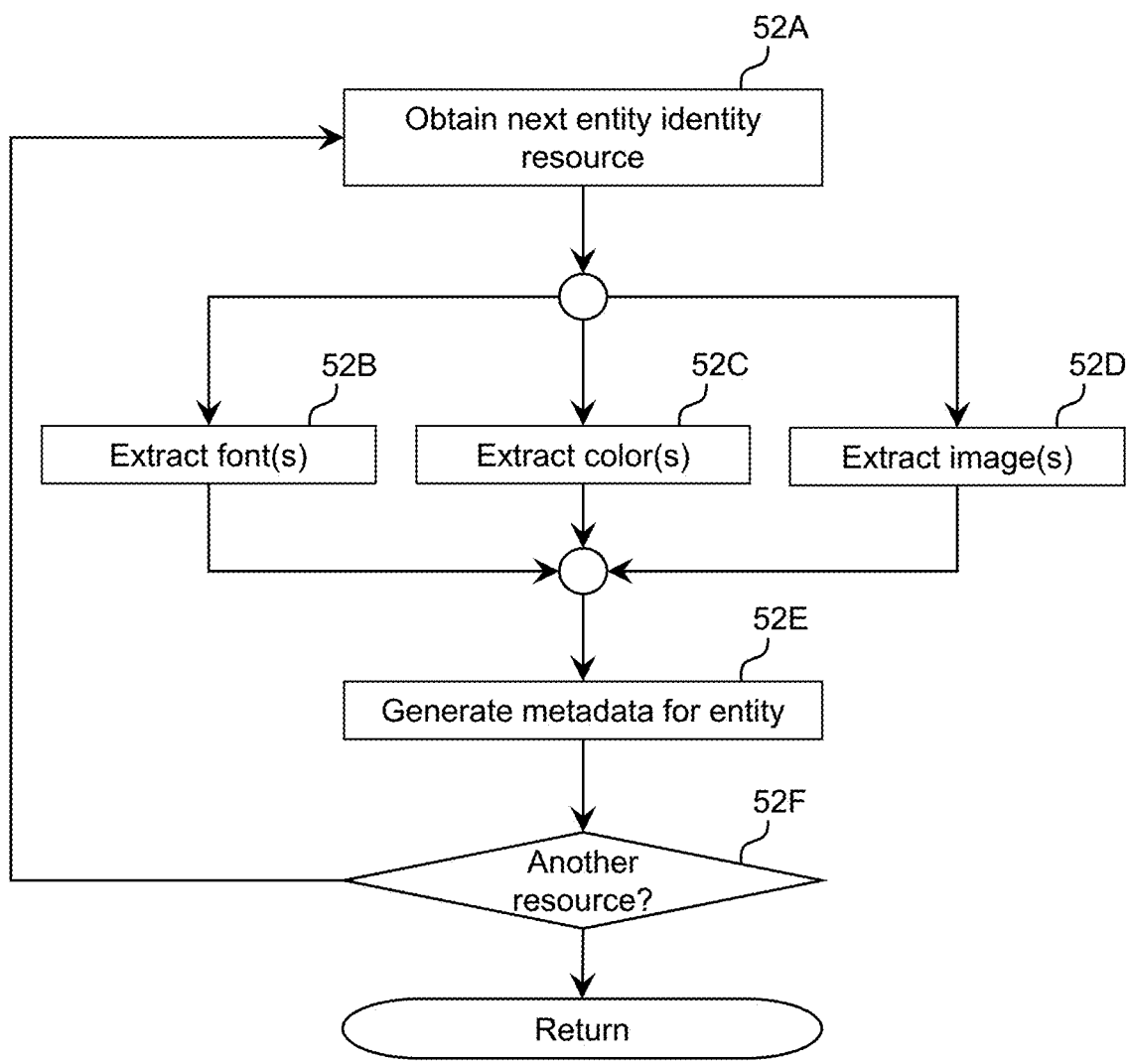
FIG. 5 shows an illustrative process for extracting brand information from entity identity resources according to an embodiment.

FIG. 5 shows an illustrative process, which can be implemented by the computer system 20 (FIG. 1), for extracting brand information from entity identity resources according to an embodiment. For example, the brand management program 30 (FIG. 1) can include a detection module, which is configured to perform the process shown in FIG. 5 when executed by the computer system 20. In action 52A, the computer system 20 can obtain a next resource to be processed. To this extent, when multiple entity identity resources are to be processed, the computer system 20 can use any solution for determining an order in which they are processed. For example, the computer system 20 can process each entity identity resource included in an index of significant entity resources 36D (FIG. 4) first, and subsequently process each entity identity resource included in an index of low priority entity resources 36E (FIG. 4). In this case, the computer system 20 can perform a lower amount of processing/analysis of the low priority entity resources 36E when significant style information has been extracted from the significant entity resources 36D.

Regardless, in general, the resource processing can include the extraction of one or more attributes corresponding to a brand of the entity. As described herein the brand relates to how an entity desires to present itself to third parties outside of the entity. As a result, data corresponding to how a resource presents information can relate to the brand of the entity. For example, in action 52B, the computer system 20 can extract font information from the entity identity resource using any solution. For example, depending on the format of the entity identity resource, the font information can be embedded in the metadata for the resource. Alternatively, the computer system 20 can perform an optical character recognition, or the like, on image text, which can be analyzed for a corresponding font using any solution.

In action 52C, the computer system 20 can extract color information for the entity identity resource using any solution. For example, the color information can include data corresponding to the color utilized for text appearing in titles, the header, the footer, and/or the like. Color information also can include data regarding a background used, borders, and/or the like. Furthermore, the color information can include data corresponding to an overall color theme of the entity identity resource, such as the predominant color(s), secondary color(s), and/or the like.

In action 52D, the computer system 20 can extract image(s) that may be included in the entity identity resource. The computer system 20 can evaluate the image for any information conveyed through the use of the image in the entity identity resource. Such information can relate to one or more aspects regarding the content that is being conveyed by the entity, such as whether the information is serious or informal, a business category relevant to the information, an attribute of the entity (e.g., customer focused, environmentally friendly, and/or the like), etc.

In action 52E, the computer system 20 can generate metadata for the entity based on the extracted information. The metadata extracted from an entity identity resource can include one or more of: data corresponding to the tone and mood of the language; data corresponding to the industry, specialty, discipline of the entity; and/or the like. In action 52F, the computer system 20 can determine whether any additional entity identity resources require processing, and if so, the process can return to action 52A. Otherwise, the process can return.

Returning to FIG. 3, in action 54, the computer system 20 can generate preliminary suggestions for a style guide. The preliminary suggestions can be based on an analysis of the entity brand information (e.g., fonts, colors, images, metadata, and/or the like) extracted from the entity identity resources. For example, the computer system 20 can evaluate the style(s), e.g., as defined by the typeface(s) and color scheme(s), utilized in the entity identity resources to determine whether one or more common branding styles are present throughout the entity identity resources. When multiple distinct styles (e.g., as defined by the use of different combinations of typeface and color scheme, and/or the like) are utilized in the entity identity resources, the computer system 20 can use any solution to determine the preliminary suggestion for the style guide. For example, the computer system 20 can utilize the style most commonly used in the entity identity resources. However, it is understood that the computer system 20 can use various solutions for selecting a particular style. For example, when a style is consistently utilized on the most recently generated entity identity resources, the computer system 20 can select the recently used style for use in the preliminary suggestions.

In an embodiment, the computer system 20 can include multiple styles identified by analyzing the entity identity resources as alternative styles in the ad hoc style guide 37. When including multiple styles, the computer system 20 can include information regarding each of the styles. For example, the computer system 20 can identify the frequency with which each style was utilized in the entity identity resources. Additionally, the computer system 20 can identify one or more attributes associated with a particular style. For example, when a particular style is most commonly used in entity identity resources of a particular type (e.g., a user manual), during a particular timeframe, and/or the like, the computer system 20 can provide such an indication.

Regardless, when generating the ad hoc style guide 37, the computer system 20 can make one or more adjustments to the actual style(s) and/or attributes utilized in the entity identity resources. For example, the computer system 20 can select a similar color scheme to a color scheme used in the entity identity resources, which may provide a more suitable combination of colors than those used in the entity identity resources. In an embodiment, the computer system 20 can provide the similar color scheme as a proposed alternative to the color scheme utilized, both of which can be included in the ad hoc style guide 37.

Additionally, the computer system 20 can supplement the ad hoc style guide 37 with suggestions derived from the actual style(s) and/or attributes utilized in the entity identity resources. For example, the computer system 20 can identify a set of commercially-usable images for inclusion in the ad hoc style guide 37. Such images can be selected based on their matching one or more attributes of the style(s) derived from the entity identity resources. It is understood that images are only illustrative of various suggestions, which the computer system 20 can include in the ad hoc style guide 37. Other possible types of suggestions can include: layouts, keywords, and/or the like.

Similarly, as shown in action 56, the computer system 20 can determine whether any attributes of the style may be proprietary and therefore subject to restricted usage. For example, illustrative attributes that may be subject to restricted usage include: a typeface with restrictions on commercial usage; a copyrighted image; and/or the like. For each such attribute, in action 58, the computer system 20 can identify a nearest match to the attribute in a corresponding open source library. The computer system 20 can use any solution for identifying a nearest match. For example, the computer system 20 can identify various quantitative attributes of an open source attribute with the quantitative attributes of the proprietary attribute. Additionally, the computer system 20 can use a database of suggested substitutions of open source resources for proprietary resources. Subsequently, the computer system 20 can include the open source attribute in the ad hoc style guide 37. For example, the computer system 20 can substitute the open source attribute for the proprietary attribute or offer one or more comparable open source attributes as suggested alternative(s) to the proprietary resource also included in the ad hoc style guide 37. For typefaces, an illustrative open source library is GOOGLE Fonts. For images, an illustrative open source library is CREATIVE COMMONS. However, it is understood that these libraries are only illustrative of various possible open source libraries that can be utilized. Furthermore, when the entity includes a license to commercially utilize attributes included in a restricted library, the computer system 20 also can utilize alternatives from such a library in addition to open source libraries.

Additionally, the computer system 20 can generate brand information for inclusion in the ad hoc style guide 37 from brand information extracted from the entity identity resources. For example, when an image extracted from an entity identity resource is represented as a raster image, the computer system 20 can transform the image to scalable image data, such as vector image data. To this extent, as shown in action 60, the computer system 20 can determine whether a raster image asset has a corresponding vector image asset available. For example, the entity identity resources may include multiple instances of a logo for the entity, where some of these instances may be embodied as raster-based images while one or more instances may be embodied using vector graphics. In this case, the computer system 20 can select the vector version of the logo image for use as the logo in the ad hoc style guide 37.

When an image, such as a logo, does not have a corresponding vector version, in action 62, the computer system 20 can generate a vector version from the raster version(s). The computer system 20 can use any solution for transforming the raster image data to vector image data. Regardless, the computer system 20 can use an instance of the image having the highest resolution to perform the transformation. When no instance has sufficient resolution, the computer system 20 can prompt a user for a higher resolution instance for the image, and/or generate a warning regarding the image.

As a result of the process described herein, the computer system 20 can generate the ad hoc style guide 37. The ad hoc style guide 37 can include one or more style(s), each of which can include one or more alternatives for one or more of the corresponding style attributes as described herein. To this extent, in action 64, the computer system 20 can receive input from a user 12 (FIG. 1) to generate the brand style guide 38 from the ad hoc style guide 37. The input can include: selection of one or more alternatives for use as a style attribute; alteration of one or more attributes of a style; removal of one or more attributes from a style (e.g., an image); addition of one or more attributes to a style; removal and/or addition of a style; and/or the like. The computer system 20 can obtain such input using any solution. For example, the computer system 20 can generate a graphical user interface for presentation to the user 12, which includes various user interface controls to enable the user 12 to add, delete, modify, and/or define a style for inclusion in the brand style guide 38. In any event, the brand style guide 38 can be stored as brand data 34, which is subsequently accessible to and/or further modifiable by the user 12.

Figure 6:
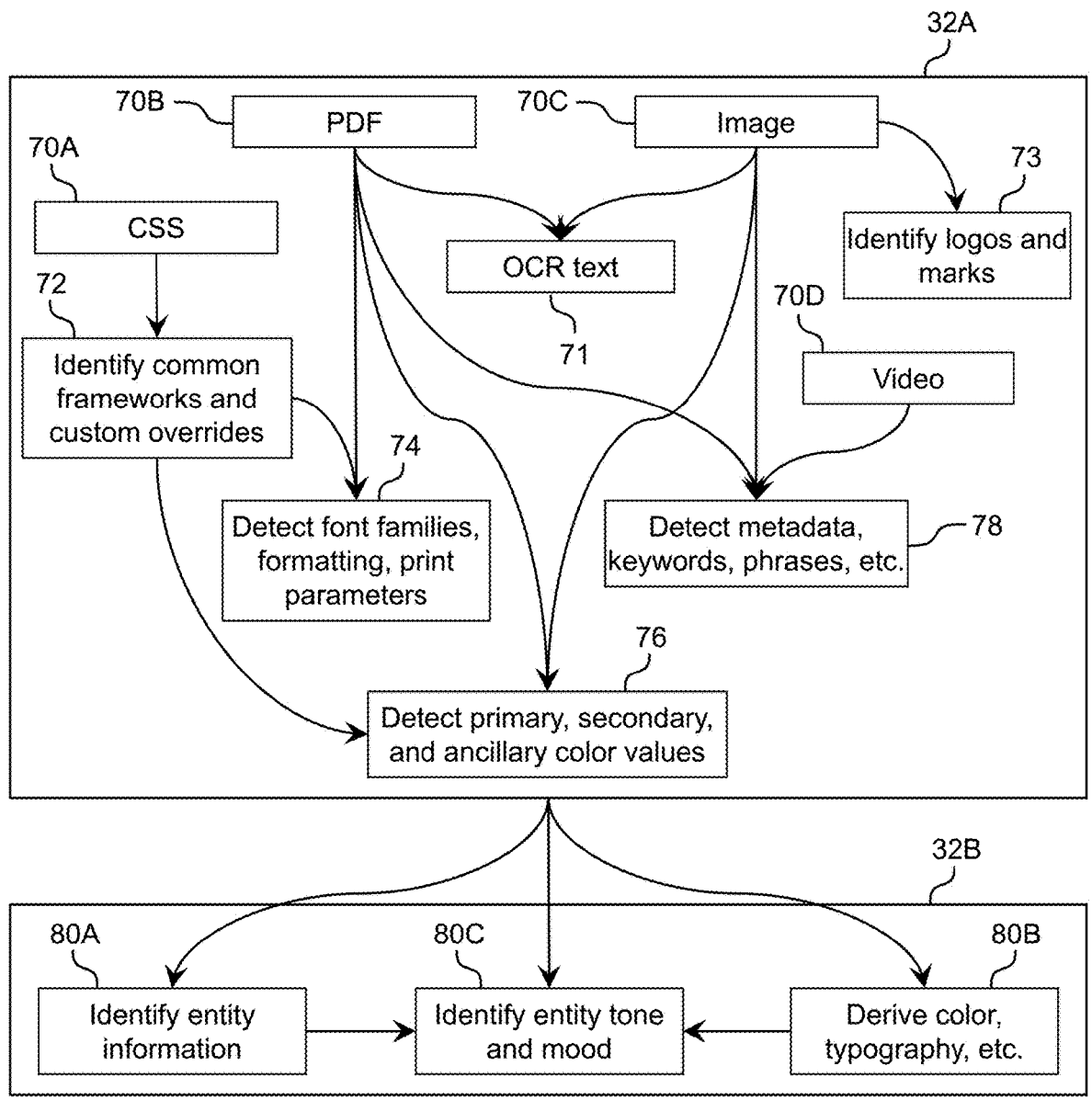
FIG. 6 shows a process flow for detecting a brand for an entity according to an embodiment.

As discussed herein, the computer system 20 can process different types of data to extract information regarding the branding utilized by an entity. FIG. 6 shows a process flow, which can be implemented by the computer system 20 (FIG. 1), for detecting a brand for an entity according to an embodiment. In an embodiment, the process shown in FIG. 6 is implemented by a presentation detection engine 32A and an information detection engine 32B, each of which can comprise, for example, a software module of a brand management program 30 (FIG. 1), which can be executed by a computer system 20.

Regardless, the computer system 20 can process any of various types of files that include an explicit description of the presentation of a document. For example, in action 70A, the computer system 20 can process a cascading style sheet (CSS) file. In this case, in action 72, the computer system 20 can process the CSS data to identify common frameworks and custom overrides used in the presentation of each particular CSS file. Additionally, in action 74, the computer system 20 can detect font families, formatting, print parameters, and/or the like, which are specified in the CSS data. Furthermore, in action 76, the computer system 20 can detect the primary, secondary, and ancillary color values used in the presentation of the information for a CSS file.

Similarly, in action 70B, the computer system 20 can process a portable document format (PDF) file. As with the CSS file, the PDF file can include an explicit description of one or more presentation attributes. To this extent, in action 74, the computer system 20 can detect font families, formatting, print parameters, and/or the like, which are defined in the PDF data, and in action 76, the computer system 20 can detect primary, secondary, and ancillary color values defined in the PDF data. For some PDF files in which text data has been converted to image data, in action 71, the computer system 20 can first perform an optical character recognition (OCR) operation on the image data to generate text and corresponding font information from the image data, which the computer system 20 can utilize in actions 74, 76. Additionally, the computer system 20 can extract other data from the text included in the PDF file 70B. To this extent, in action 78, the computer system 20 can detect metadata, keywords, phrases, and/or the like, that are present in the text.

Furthermore, the computer system 20 can process other types of data. For example, as shown in action 70C, for image data (e.g., raster, bytecode, scalable vector graphics (SVG), and/or the like), the computer system 20 also can perform an OCR operation on the image data in action 71 to identify any text included in the image data. Furthermore, in action 73, the computer system 20 can identify any logo or other trademark/service mark, which may correspond to the image. Additionally, when the image data includes text (as identified by the OCR) as well as for video data identified in action 70D, in action 78, the computer system 20 can detect metadata, keywords, phrases, and/or the like, in the corresponding text/audio.

It is understood that the file and data formats described herein are only illustrative of various formats that can be processed by the computer system 20. Other formats include: text, hypertext markup language (HTML), extensible markup language (XML), a word processing file format, and/or the like. Regardless, the data extracted from the file by the computer system 20 (e.g., executing the presentation detection engine 32A), can be stored as brand data 34 (FIG. 1) and subsequently utilized in generating the brand style guide 38 (FIG. 3) as described herein.

Additionally, the data can be further processed by the computer system 20, e.g., executing the information detection engine 32B, to extract additional information regarding the entity. For example, in action 80A, the computer system 20 can process the brand data 34 to identify any combination of various entity information, such as a business category, an overview, summary statements, key dates (e.g., founding date), press releases, news, business locations and addresses, employee count, related entities (e.g., suppliers, customers, etc.), revenue, and/or the like. Furthermore, in action 80B, the computer system 20 can parse brand data 34 corresponding to layers, groups, symbols, objects, and/or the like, utilized in the presentation of information to derive values for color, typography, and/or the like. The additional data also can be stored as brand data 34.

In action 80C, the computer system 20 can determine a tone and a mood associated with the entity. For example, the computer system 20 can process the text, image(s), audio, color values, and/or the like, to determine an associated tone and mood associated with the entity based on the attributes utilized in the presentation of the information. For example, the computer system 20 can analyze the selection of certain words over others, colors and connotations of image data, selection of music, background colors, etc., which the computer system 20 can combine to evaluate an overall tone and mood utilized by the entity when conveying information. To this extent, the computer system 20 can implement one or more processes for determining the tone and mood including: natural language processing (NLP); sentiment analysis; human-implemented evaluation (e.g., using feedback provided by a large number of people or one or more experts); and/or the like. Additionally, the computer system 20 can enable a user 12 to directly assign and/or override mood/tone attributes using any solution. In an embodiment, the computer system 20 can determine multiple tones and moods associated with the entity. For example, an entity may utilize different tones and moods when presenting information regarding different products, different services, different events, and/or the like. Furthermore, the computer system 20 can identify one or more items in brand data 34 that include one or more attributes that significantly vary from the identified tone(s) and mood(s). In response, the computer system 20 can provide a result of such an analysis for presentation to a user 12 (FIG. 1).

As a result of the workflow shown in FIG. 6, the computer system 20 will have various brand data 34 derived from the presentation attributes used in various resources associated with the entity. As described herein, the computer system 20 can process the brand data 34 to generate a brand style guide 38 (FIG. 3) for the entity, which includes various assets defining one or more branding strategies associated with the entity. Furthermore, the computer system 20 can generate one or more additional branding resources, which can be stored in a brand asset repository 40 (FIG. 1) for subsequent use by various users, entity systems, third party systems, and/or the like.

Figure 7:
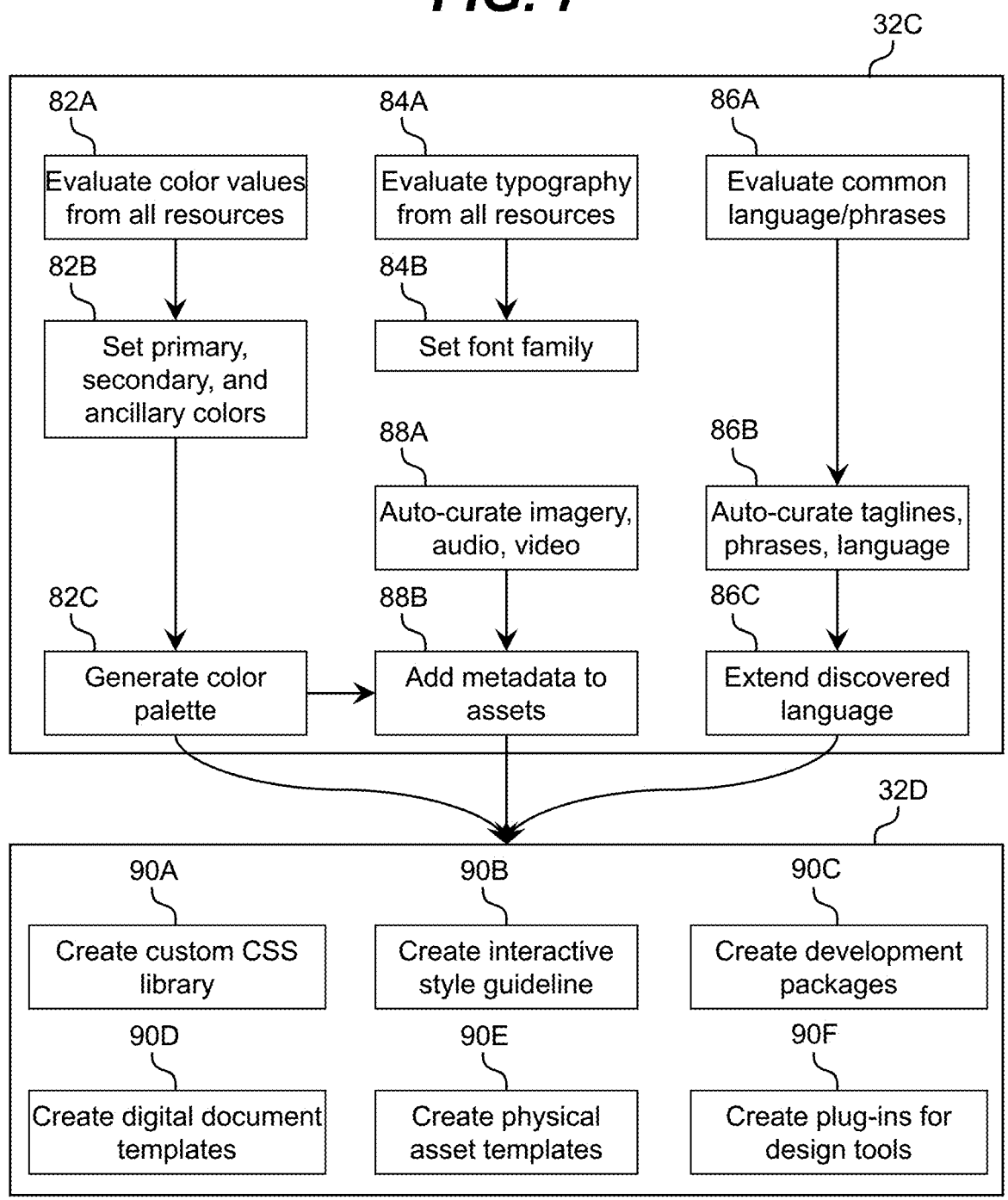
FIG. 7 shows a more detailed workflow diagram for generating branding resources according to an embodiment.

To this extent, FIG. 7 shows a more detailed workflow diagram, which can be implemented by the computer system 20, for generating branding assets according to an embodiment. For example, the computer system 20 can include a style guide module 32C which, when executed by the computer system 20, can evaluate the various brand data 34 obtained from the resources and generate the brand style guide 38 as described herein. Additionally, the computer system 20 can include a resource generation module 32D which, when executed by the computer system 20, can generate one or more additional assets for use in generating branded resources in conformance with the brand style guide 38 as described herein.

In action 82A, the computer system 20 can evaluate the color data acquired from all of the resources. For example, the computer system 20 can evaluate the color data regardless of the source of the resource, or can separately evaluate the color data associated with resources obtained from the same source (e.g., same website). In either case, in action 82B, the computer system 20 can select primary, secondary, and ancillary colors for inclusion in the brand style guide 38. In an embodiment, the computer system 20 generates a single set of color values for inclusion in the brand style guide 38. In this case, when differing combinations of colors are utilized in different resources (e.g., resources obtained from different sources), the computer system 20 can use any solution to select one of the sets of color values for use in the brand style guide 38. For example, the computer system 20 can apply a weighted average to generate the set of color values. In another embodiment, the computer system 20 can include multiple distinct sets of color values in the brand style guide 38, any one of which can be selected for subsequent use.

In action 82C, for each set of color values included in the brand style guide 38, the computer system 20 can generate a color palette for use in generating electronic products, which can be included in the brand style guide 38. For example, the computer system 20 can apply color theory to generate a palette based on the set of color values (e.g., primary, secondary, and ancillary colors) for use in generating a software interface. In an embodiment, the computer system 20 can apply basic color theory to generate one or more complementary, analogous, triadic, split complementary, tetradic, and/or monochromatic palettes from the set(s) of color values included in the brand style guide 38.

Additionally, the computer system 20 can utilize additional brand information included in the brand style guide 38 that can influence color palette generation. For example, the computer system 20 can evaluate marketing imagery and generate metadata based on characteristics of the imagery (e.g., excitement, action, calmness, and/or the like) which can influence color palette generation. Similarly, one or more characteristics desired to be conveyed by the entity can be manually provided by a user. Regardless, the computer system 20 can adjust the color palette generation to generate color palettes that reinforce the characteristics (e.g., adjust brightness or contrast of the colors, shift colors, and/or the like). Similarly, the computer system 20 can define a set of colors or color combinations to avoid. For example, the computer system 20 can evaluate potential adjacent color combinations in a palette and recommend that one or more adjacent color combinations not be utilized, e.g., due to how the adjacent colors can change the human perception of color, which may adversely affect the intended branding.

Additionally, the computer system 20 can generate a palette of colors to avoid in the branding specification, e.g., due to their conveying an impression opposed to the intended branding.

In action 84A, the computer system 20 can evaluate the font data acquired from all of the resources. For example, the computer system 20 can evaluate the font data regardless of the source of the resource, or can separately evaluate the font data associated with resources obtained from the same source (e.g., same website). In either case, in action 84B, the computer system 20 can select a font family for inclusion in the brand style guide 38. In an embodiment, the computer system 20 selects a single font family for inclusion in the brand style guide 38. In this case, when differing font families are utilized in different resources (e.g., resources obtained from different sources), the computer system 20 can use any solution to select one of the font families for inclusion in the brand style guide 38. For example, the computer system 20 can apply a weighted average to select the font family. In another embodiment, the computer system 20 can include multiple distinct font families in the brand style guide 38, any one of which can be selected for subsequent use. In an embodiment, the font family can include one or more fallback fonts, which can be used in place of a primary font. For example, a fallback font can be a font related to the primary font, such as a sans-serif font which can be used in place of a serif font. In a further embodiment, the brand style guide 38 can include only limited combinations of color values and font families, which can be utilized together. For example, the computer system 20 can define pairs of color values and font families for use together based on their previous uses as indicated in the brand data 34 extracted from the various resources.

In action 86A, the computer system 20 can evaluate the text data to identify common language and phrases utilized in the resources. In action 86B, the computer system 20 can auto-curate the common language and phrases to select brand text, which can include taglines, common phrases, language, and/or the like, for inclusion in the brand style guide 38. For example, the computer system 20 can evaluate a semantic structure (e.g., as defined by HTML tags) of text data to identify common elements such as headlines, captions, articles, quotations, summaries, asides, etc. The computer system 20 can automatically curate the semantic attributes and identify common language properties in the text data obtained from various domains, documents, and/or the like. The computer system 20 can prioritize the common language and phrases based on a frequency of occurrence, relative emphasis of the text in documents (e.g., bolded, larger font, etc.), and/or the like. In action 86C, the computer system 20 can extend the brand text with additional phrases and language that are complementary to the brand text extracted from the resources. The computer system 20 can extend the brand text using any solution, such as by implementing an artificial intelligence solution, utilizing a third party service, such as Mechanical Turk, or the like, etc. The brand text can be automatically included in products subsequently produced using the brand style guide 38 or made readily available for inclusion in a product being produced using the brand style guide 38 as described herein.

In action 88A, the computer system 20 can auto-curate the images, audio, video, and/or the like, which was extracted from the various resources for inclusion in the brand style guide 38. The computer system 20 can use any solution for selecting the images, audio, and/or video. For example, the computer system 20 can identify a set of images, audio, and/or video frequently used in the resources, prominently used in one or more resources, aligned with the tone and mood for the brand style guide 38 (or one of multiple style options included therein), and/or the like.

For each non-text (e.g., color palette, image, video, audio, font family, and/or the like) attribute included in the brand style guide 38, in action 88B, the computer system 20 can associate metadata with the non-text attribute and include the metadata in the brand style guide 38. The metadata can be included, for example, to assist in searching/filtering that may be desired to be performed on the attributes included in the brand style guide 38. For example, the computer system 20 can analyze the attributes of the corresponding attribute (e.g., colors in the color palette, image, video; pitch and tone of an audio, and/or the like) to identify metadata appropriate for the corresponding non-text attribute. Such analysis can be performed using any solution.

As discussed herein, generation of the brand style guide 38 also can include generation of one or more attributes from the extracted data (such as a vector image), substitution of one or more attributes with a suitable alternative (e.g., proprietary font with an open source font), and/or the like. Additionally, generation of the brand style guide 38 can include input from one or more users 12, such as selection from various alternatives, modification of one or more attributes, and/or the like.

The computer system 20 can use the brand style guide 38 to generate one or more branding assets, which can be stored in a brand asset repository 40. While the resource generation module 32D is shown generating a particular combination of illustrative branding assets, it is understood that embodiments of the resource generation module 32D or the computer system 20 can be configured to generate any combination of branding assets, which can include fewer assets, additional assets, and/or assets of different types than those shown and described herein.

In action 90A, the computer system 20 can create a library of CSS files. Each CSS file can include a set of presentation definitions derived from the color palette, font family, and attribute references, with each presentation definition being consistent with a branding strategy defined in the brand style guide 38 as derived from the brand data 34. The CSS file(s) in the library can be used to generate interfaces consistent with the brand for use in various applications, such as mobile and desktop applications.

In action 90B, the computer system 20 can create an interactive style guideline from the brand style guide 38. The interactive style guideline can comprise an indexed and searchable set of guidelines, which the computer system 20 can generate based on the rules and parameters defined in the brand style guide 38. To this extent, the guidelines can be formatted for readily understandable presentation to users 12 to facilitate their use of and adherence to the rules and parameters from which the guidelines are derived.

In action 90C, the computer system 20 can create a set of development packages. Each development package can comprise a configurable package for use by a developer in selectively choosing which resources of the library of CSS files are to be installed. For example, the development packages can include different packages of assets relevant for use by a developer in creating a framework with differing amounts of styling, different packages for different platforms (e.g., mobile versus desktop), and/or the like. A package can include CSS code responsible for the presentation of an application or web page. The CSS code can ensure that a developer is employing the correct user interface related attributes, including one or more of: color values, typography, grids, spacing, animations, and/or the like. The CSS code can be thoroughly commented to define and delineate the purpose of each of the sections of code. The CSS code can be delivered in a multi-part package so as to modularize the implementation. This allows the developer to only include the subset of the CSS code required to implement a particular view/state/feature. A package also can include audio-visual assets, such as images, audio files, video files, and/or the like. Furthermore, a package can include pre-configured templates, such as HTML templates, which specify the required or recommended content without regard to content layout or appearance attributes, which can be specified by the CSS code and/or other artifacts.

In action 90D, the computer system 90D can create a set of digital document templates. Each document template can be configured for use in conjunction with software in order to generate a corresponding electronic document with presentation attributes that follow the brand style guide 38. For example, a document template can be configured for use with a word processing program, a presentation program, a desktop publishing program, a webpage editing program, and/or the like. As is known, the document template can be used to provide a set of default presentation attributes, which allows the user to add content to the document having the desired presentation attributes.

In action 90E, the computer system 90E can create a set of physical product templates. Each physical product template can be utilized by, for example, a print service provider, a promotional products company, a manufacturer, and/or the like, in generating physical products associated with the entity, which are consistent with the branding strategy of the entity. A physical product template can include, for example: typography, color, and/or logo settings for use on promotional articles, bindings, tabs, slipsheets, inserts, and/or the like; watermarks; cover art; cover logo; cover typography; document jacket specifications; print packaging specifications; product color(s); and/or the like.

In action 90F, the computer system 20 can create a set of plug-ins for various types of applications. For example, a plug-in can be used in conjunction with a design application, such as Photoshop, Sketch, Affinity Designer, and/or the like, and can be used to automatically generate a color palette, grid, headline, article content, entity-specific content, and/or the like, when using the design application. Additionally, a plug-in can be used in conjunction with a word processing program, a presentation program, a desktop publishing program, a webpage editing program, and/or the like, and can be used to verify compliance with a particular branding strategy and/or identify variances from the branding strategy.

Figure 8:
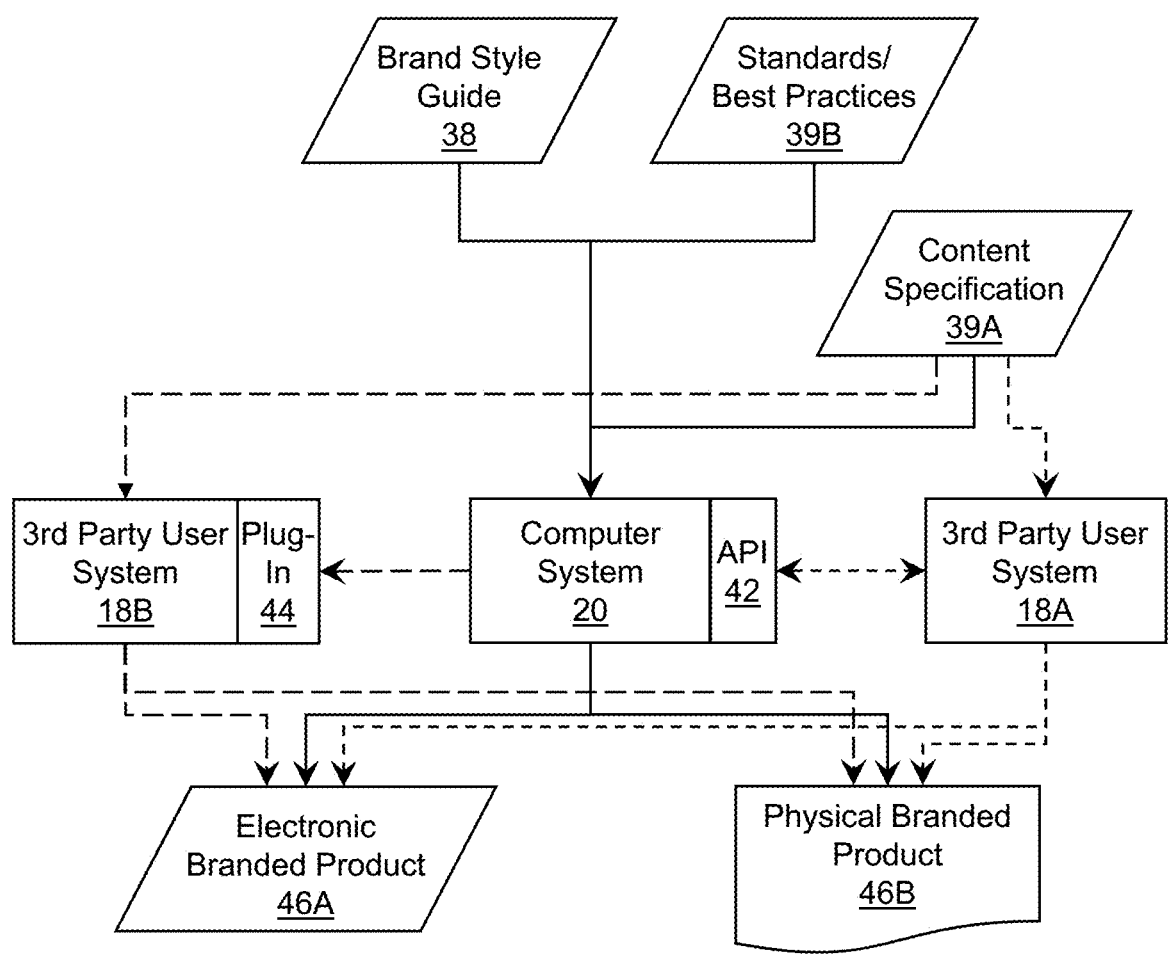
FIG. 8 shows an illustrative data flow diagram for generating branded products according to an embodiment.

As discussed herein, the brand style guide 38 and/or the corresponding branding assets generated therefrom, can be utilized in the development of various products having the appropriate branding for the entity. To this extent, FIG. 8 shows an illustrative data flow diagram for generating branded products 46A, 46B according to an embodiment. As illustrated, the computer system 20 can use the brand style guide 38 to create branded products 46A, 46B and/or to interface with one or more third party user systems 18A, 18B, which can create the branded products 46A, 46B in conformance with the brand style guide 38. As used herein, a third party user system 18A, 18B can comprise, for example, a entity system 14 (FIG. 1), a third party system 16 (FIG. 1), a computer system utilized by the user 12 (FIG. 1), and/or the like.

In an event, to create a branded product 46A, 46B, content specification data 39A can be obtained by the corresponding system 18A, 18B, 20 using any solution. The content specification data 39A can define the content to be included in the corresponding branded product 46A, 46B. The content specification data 39A can be embodied in any of various formats. For example, the content specification data 39A can be stored in an electronic file, input using an interface of a program (e.g., word processor, presentation program, and/or the like) executing on the corresponding system 18A, 18B, 20, etc.

Regardless, the system 18A, 18B, 20 can generate the branded product 46A, 46B by applying a branding strategy outlined in the brand style guide 38 to the presentation of the content specification data 39A. For example, the computer system 20 can utilize one or more of the branding assets (e.g., CSS file, template, and/or the like) stored in the brand asset repository 40 (FIG. 1) to apply the branding strategy to the content specification data 39A.

As described herein, the computer system 20 can manage access to and/or utilization of the brand style guide 38 by the third party user systems 18A, 18B. Such management can be performed using any of various solutions. For example, as illustrated with respect to the third party user system 18A, the computer system 20 can manage an application program interface (API) 42, which enables the third party user system 18A to request data regarding the brand style guide 38 and receive the requested data from the computer system 20. For example, the API 42 can expose: color palette library(ies); logo assets (e.g., raster and/or vector versions); supplemental imagery (e.g., backgrounds, textures, gradients, and/or the like); etc., which can be included in the brand style guide 38.

In another embodiment, as illustrated with respect to the third party user system 18B, the computer system 20 can provide a plug-in 44 for execution on the system 18B. In particular, the plug-in 44 can be configured to extend one or more capabilities of a corresponding application with which the plug-in 44 is configured to operate. To this extent, the plug-in 44 can include data derived from the brand style guide 38 at the time the plug-in 44 is created by the computer system 20 and extend the software application to provide one or more mechanisms for accessing and/or utilizing the data derived from the brand style guide 38. For example, the plug-in 44 can contain mechanisms for applying a color palette, provide a library of entity assets, include access to one or more templates, and/or the like, which can enable the third party user system 18B to generate a branded product 46A, 46B with the correct branding. A plug-in 44 configured to operate in conjunction with an editor for generating a CSS file can evaluate the current CSS code against a set of requirements derived from the brand style guide 38. In this case, the plug-in 44 can generate a warning or error message in response to detecting a conflict between a definition in the current CSS code and the requirements.

In an embodiment, the computer system 20 can use additional data in managing use of the brand style guide 38 as described herein. For example, the computer system 20 can use data corresponding to a set of standards or best practices 39B in generating one or more recommendations or requirements for use in conjunction with creating the branded product(s) 46A, 46B. In an embodiment, one or more of the standards or best practices are generic to various types of branded products 46A, 46B. For example, the data 39B can define a standard/best practice in layout (e.g., golden ratio, rule of thirds, and/or the like), color theory (e.g., out of gamut warnings, suggested Pantone colors, and/or the like), typography, etc. Additionally, the data 39B can define a standard/best practice applicable to only a subset of the various types of branded products 46A, 46B, such as a standard/best practice for: presenting data on desktop or mobile devices, engraving, embossing, three-dimensional printing, etc.

Figure 9:
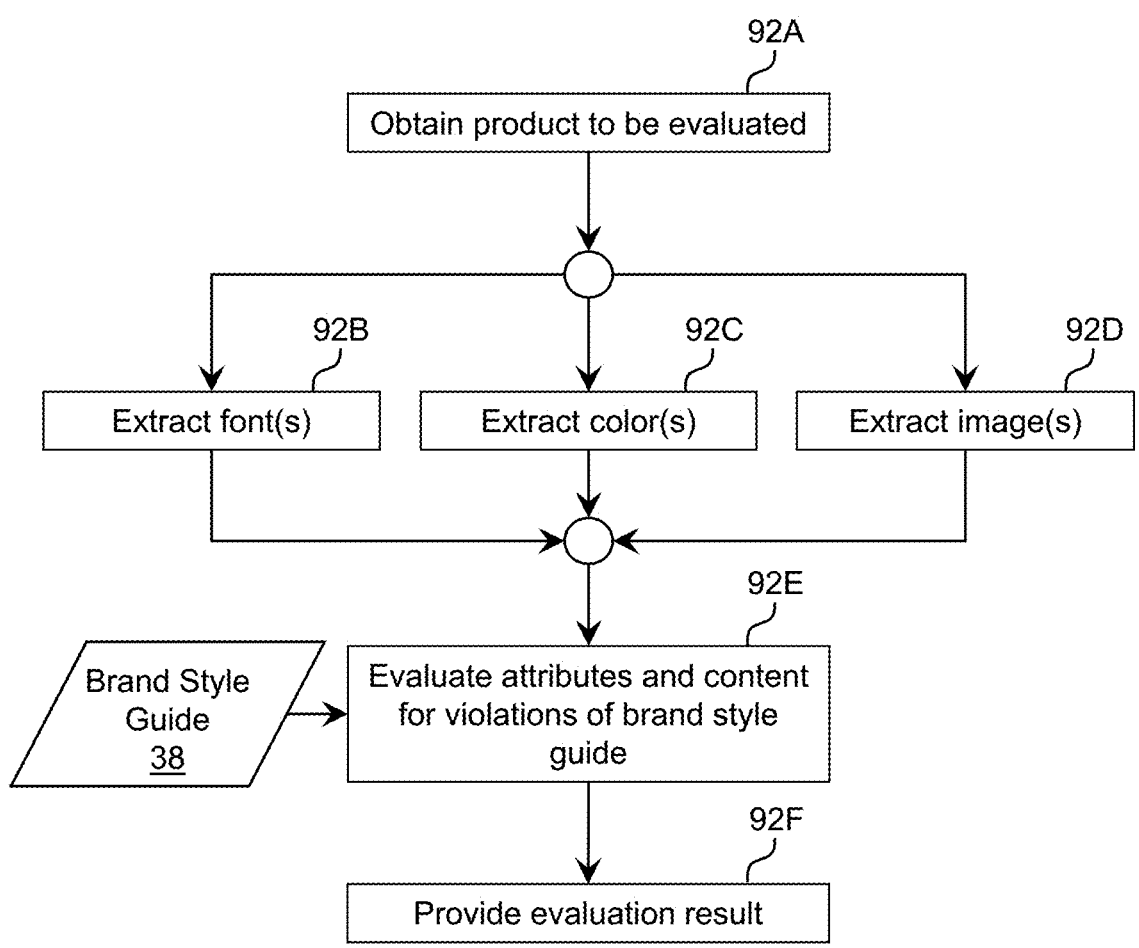
FIG. 9 shows an illustrative process for evaluating a product for compliance with an entity brand according to an embodiment.

In addition to utilizing the brand style guide 38 to create new branded product(s) 46A, 46B, the computer system 20 also can evaluate an existing branded product 46A, 46B (or the specification therefor) for compliance with the specifications of the brand style guide 38. To this extent, FIG. 9 shows an illustrative process, which can be implemented by the computer system 20 (FIG. 1), for evaluating a product for compliance with an entity brand according to an embodiment. While the process is described as being performed by the computer system 20, it is understood that the process can be implemented by another system, such as through the use of an API 42 (FIG. 8), a plug-in 44 (FIG. 8), and/or the like.

In any event, in action 92A, the computer system 20 can obtain a product to be evaluated. The product can comprise, for example, an electronic branded product 46A (FIG. 8), which has been published or is proposed for publishing, a specification for creating a physical branded product 46B, which has been utilized or is proposed for utilization, and/or the like. Regardless, the computer system 20 can extract presentation information from the product. To this extent, in action 92B, the computer system 20 can extract font(s) used in the product; in action 92C, the computer system 20 can extract color(s) used in the product; and in action 92D, the computer system 20 can extract image(s) included in the product. In each action 92B-92D, the computer system 20 can use any solution for extracting the information.

In action 92E, the computer system 20 can evaluate the extracted attributes and the content of the product for one or more violations of the brand style guide 38. Such violations can include: use of inappropriate font/color/image; incorrect mood or tone of the content; and/or the like. In action 92F, the computer system 20 can provide a result of the evaluation for presentation to a user 12 (FIG. 1) using any solution. For example, the computer system 20 can provide a description of each violation, if any, that is present in the product, highlight the violation(s) in the product, propose a modification to fix a violation, enable a user 12 to request that the violation be fixed by the computer system 20, and/or the like.

The process shown in FIG. 9 can be repeated and/or concurrently performed for any number of products. Additionally, the process can be applied to various types of products. In an illustrative application, the computer system 20 can evaluate brand attributes for numerous products located at numerous sources and identify and propose resolutions to inconsistencies. For example, after years of updates, changes, new developers, and/or the like, a website for an entity can become inconsistent with brand-related items, such as color palettes. Slight variations in color values or typography can lead to inconsistent presentation, which can diminish the brand of the entity. The computer system 20 can identify fluctuations in color values, type sizes, etc., and propose and/or make adjustments based on the brand style guide 38.

In an embodiment, the computer system 20 can enable a user 12 to request a variance from a requirement of the brand style guide 38 in a product. In this case, the computer system 20 can enable the user 12 to generate and send a request to a supervisor, party responsible for the product, and/or the like, which indicates the violation and a reason for requesting the variance. Furthermore, the computer system 20 can be configured to receive a response from the supervisor regarding the request and address the violation in accordance with the response (e.g., by continuing to highlight the violation, correcting the violation, ignoring the violation, and/or the like).

As an entity may periodically make one or more changes to its branding style guide 38, the computer system 20 can implement a process for updating a set of pre-existing entity products to the revised requirements. It is understood that a similar process can be utilized for any purpose, such as to update any group of entity products, which may preexist the branding style guide 38 and/or may have been created without use of the branding style guide 38. To this extent, FIG. 10 shows an illustrative process, which can be implemented by the computer system 20 (FIG. 1), for updating a set of entity products to align with a branding style guide 38 (FIG. 1) according to an embodiment. While the process is described as being performed by the computer system 20, it is understood that the process can be implemented by another system, such as through the use of an API 42 (FIG. 8), a plug-in 44 (FIG. 8), and/or the like.

In action 94A, the computer system 20 can receive a change to the brand style guide 38 using any solution. For example, the change can be made by an authorized user 12, and in response, the computer system 20 can propagate the change throughout the products. Alternatively, the user 12 can request that the computer system 20 propagate the change(s) to a brand style guide 38. In any event, in action 94B, the computer system 20 can obtain a next product to be updated using any solution. For example, the computer system 20 can comprise a database of products being managed by the computer system 20 and access information for each product. Alternatively, the user 12 can specify a location at which the product(s) to be updated can be accessed. Regardless, it is understood that these are only illustrative of various possible approaches.

In action 94C, the computer system 20 can update the font(s) utilized in the product to align with the font(s) required by the brand style guide 38. In action 94D, the computer system 20 can update the color(s) utilized in the product to align with the color(s) required by the brand style guide 38. In action 94E, the computer system 20 can update the logo(s) included in the product with the logo(s) included in the brand style guide 38. While the computer system 20 can perform all actions 94C-94E, it is understood that embodiments can include performing only a subset of the actions 94C-94E based on the required/requested change(s).

In action 94F, the computer system 20 can evaluate the updated product for conformance with the brand style guide 38. For example, the computer system 20 can confirm that each update was successful. Additionally, the computer system 20 can evaluate additional attributes of the product, such as the mood and tone, for conformance with the brand style guide 38. When a violation is identified, the computer system 20 can present an error message for presentation to a user 12 indicating the violation. Regardless, in action 94G, the computer system 20 can determine whether another product requires updating and, if so, the process can return to action 94B.

As described herein, embodiments of the invention improve the manner in which a computer functions. For example, an embodiment generates assets, such as the brand style guide, templates, an API, a plug-in, and/or the like, described herein, which makes the generation and maintenance of products having a consistent branding significantly easier. Use of these assets enables the computer system to detect and/or prevent the introduction of non-standard properties which would otherwise result in disparate or inconsistent presentation styles used in the products. An amount of time required to test user interfaces can be reduced from prior art approaches through the use of assets described herein. Furthermore, the brand asset repository can be utilized to enable additional individuals within an organization who are outside of the creative/marketing/design team to generate products consistent with the entity's branding strategy. Such individuals can generate these products even when no clear written documentation or marketing oversight is available or provided.

Even further, an embodiment of the invention can enable an entity to create a branding strategy for subsequent use from the products it has previously produced. For example, an entity may not have defined a branding strategy, but one or more branding strategies may be implicit in the products previously generated by the entity. As an entity expands, hires a new marketing company, and/or the like, a more formal branding strategy may be desired due to an increased number of employees. In this case, a solution described herein can enable the quick generation of such a formal branding strategy utilizing these products.

Embodiments of the invention can further solve one or more problems specific to computer systems. For example, computer systems have made it easy for multiple individuals to create products on behalf of an entity, which may be made available as a collection (such as a collection of web pages under a single website). These products can vary due to style differences of the individuals. Additionally, these products can remain accessible to the public over the course of years. For software development, problems relating to variations present in the resulting products due to individualistic style differences have been resolved with tools that enforce certain coding conventions (e.g., ensure consistent formatting and structure of the program code). An embodiment of the invention provides new tools, which enforce brand styles in the interfaces of products including the software and/or the products generated using various types of third party software products. Such enforcement can be implemented for newly created products as well as to update previously created products, which remain accessible to third parties. A similar problem can be presented due to, for example, a merger between two entities. In this case, the merged entity may want to update the website of one or both previously independent entities with a branding strategy of the combined entity. An embodiment of the invention can be utilized to largely automate a process of updating the web pages for a website to reflect the currently desired branding strategy.

While shown and described herein as a method and system for managing branding for an entity, it is understood that aspects of the invention further provide various alternative embodiments. For example, in one embodiment, the invention provides a computer program fixed in at least one computer-readable medium, which when executed, enables a computer system to manage branding for the entity using a process described herein. To this extent, the computer-readable medium includes program code, such as the brand management program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the brand management program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing branding for an entity using a process described herein. In this case, the generating can include configuring a computer system, such as the computer system 20 (FIG. 1), to implement the method of managing branding for the entity. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of managing branding for an entity, the method comprising:
generating, on a computer system, a brand style guide that contains requirements for at least one brand, the requirements describing how a tone and a mood created by the tone are used by an entity when conveying information in entity content, wherein the brand style guide includes data defining at least one branding strategy to manage applying the tone and mood to entity products for the entity, wherein the generating includes:
the computer system identifying a set of electronic entity identity resources representative of the at least one brand for the entity;
the computer system extracting entity brand attributes from each electronic entity identity resource in the set of electronic entity identity resources, wherein the entity brand attributes determine how content of the electronic identity resource is presented, wherein the extracting includes extracting at least one of: image data, font data, color data, or text, from the electronic entity identity resource that contribute to the tone and mood used in the electronic entity identity resource;
the computer system automatically generating an ad hoc style guide for the entity using the extracted entity brand attributes that contribute to the tone and mood of the set of electronic entity identity resources, wherein the ad hoc style guide includes at least one ad hoc branding strategy including data derived from the extracted entity brand attributes and a set of proposed alterations to the data derived from the extracted entity brand attributes or a set of additions for inclusion with the extracted entity brand attributes, wherein the set of proposed alterations and the set of additions have a role in contributing to the tone and mood of the at least one ad hoc branding strategy;
the computer system providing the ad hoc style guide for presentation to a user for selection of one or more of the extracted entity brand attributes and the set of proposed alterations or the set of additions for use in generating the brand style guide;
the computer system receiving input from the user that is indicative of the selection from the ad hoc style guide, the input forming the requirements describing how the tone and mood are used by the entity when conveying information in entity content; and
the computer system generating the brand style guide based on the input.

2. The method of claim 1, wherein the identifying includes:
the computer system identifying a set of websites associated with the entity; and
the computer system identifying a subset of webpages available at each website in the set of websites relating to the at least one branding strategy for the entity;
the computer system prioritizing the webpages according to an importance of the content of the webpage to the at least one branding strategy, wherein the extracting includes the computer system extracting entity brand attributes from the subset of webpages.

3. The method of claim 1, wherein the set of entity identity resources includes at least one resource provided by a third party data provider.

4. The method of claim 1, wherein the automatically generating includes:
the computer system identifying at least one entity brand attribute as a proprietary asset;
the computer system identifying at least one open source asset matching attributes of the proprietary asset; and
the computer system including the at least one open source asset in the ad hoc style guide.

5. The method of claim 1, wherein the automatically generating includes the computer system generating a vector image resource from a raster image resource.

6. The method of claim 1, further comprising the computer system creating a branded product for the entity using the brand style guide, wherein the creating includes the computer system applying a branding strategy defined in the brand style guide to content specification data for the branded product.

7. The method of claim 1, wherein the generating further includes the computer system identifying a set of suggested images matching attributes of the extracted entity brand attributes, and including the set of suggested images in the ad hoc style guide.

8. The method of claim 1, further comprising the computer system evaluating an entity product for compliance with the brand style guide.

9. The method of claim 1, further comprising:
the computer system receiving a modification to the brand style guide; and
the computer system updating a set of entity products to incorporate the modification to the brand style guide.

10. The method of claim 1, further comprising the computer system managing an application program interface that enables a third party user system to query and receive data corresponding to the brand style guide for the entity.

11. The method of claim 1, further comprising the computer system generating a software plug-in that extends a set of capabilities of a third party user system based on the brand style guide, wherein the software plug-in provides entity brand recommendations when developing branded products using the third party user system.

12. A computer system for managing branding for an entity, the computer system comprising:
a set of computing devices configured to generate a brand style guide that contains requirements for at least one brand, the requirements describing how a tone and a mood created by the tone are used by an entity when conveying information in entity content, wherein the brand style guide includes data defining at least one branding strategy to manage applying the tone and mood to entity products for the entity, and wherein the set of computing devices generate the brand style guide by performing a process including:
identifying a set of electronic entity identity resources representative of the at least one brand for the entity;
extracting entity brand attributes from each electronic entity identity resource in the set of electronic entity identity resources, wherein the entity brand attributes determine how content of the electronic identity resource is presented, wherein the extracting includes extracting at least one of: image data, font data, color data, or text, from the electronic entity identity resource that contribute to the tone and mood used in the electronic entity identity resource;
determining the tone and mood from the extracted entity brand attributes, wherein determining the tone and mood includes analyzing a selection of an entity brand attribute over other options;
automatically generating an ad hoc style guide for the entity using the extracted entity brand attributes that contribute to the tone and mood of the set of electronic entity identity resources, wherein the ad hoc style guide includes at least one ad hoc branding strategy including data derived from the extracted entity brand attributes and a set of proposed alterations to the data derived from the extracted entity brand attributes or a set of additions for inclusion with the extracted entity brand attributes, wherein the set of proposed alterations and the set of additions have a role in contributing to the tone and mood of the at least one ad hoc branding strategy;
providing the ad hoc style guide for presentation to a user for selection of one or more of the extracted entity brand attributes and the set of proposed alterations or the set of additions for use in generating the brand style guide; and
receiving input from the user that is indicative of the selection from the ad hoc style guide, the input forming the requirements describing how the tone and mood are used by the entity when conveying information in entity content; and
generating the brand style guide based on the input.

13. The computer system of claim 12, wherein the identifying includes:
identifying a set of data source locations associated with the entity; and
identifying a subset of entity identity resources available at each website in the set of websites relating to the at least one branding strategy for the entity;
prioritizing the entity identity resources according to an importance of the content of the entity identity resource to the branding strategy.

14. The computer system of claim 12, wherein the automatically generating includes:
identifying at least one entity brand attribute as a proprietary asset;
identifying at least one open source asset matching attributes of the proprietary asset; and
including the at least one open source asset in the ad hoc style guide.

15. The computer system of claim 12, further comprising a set of computing devices configured to create a branded product for the entity by applying a branding strategy defined in the brand style guide to content specification data for the branded product.

16. The computer system of claim 12, further comprising a set of computing devices configured to evaluate an entity product for compliance with the brand style guide.

17. The computer system of claim 12, further comprising a set of computing devices configured to update a set of entity products to incorporate a modification to the brand style guide.

18. The computer system of claim 12, further comprising a set of computing devices configured to manage an application program interface that enables a third party user system to query and receive data corresponding to the brand style guide for the entity.

19. The computer system of claim 12, further comprising a set of computing devices configured to generate a software plug-in that extends a set of capabilities of a third party user system based on the brand style guide, wherein the software plug-in provides entity brand recommendations when developing branded products using the third party user system.

20. A computer system for managing branding for an entity, the computer system comprising:
a set of computing devices configured to generate a brand style guide that contains requirements for at least one brand, the requirements describing how a tone and a mood created by the tone are used by an entity when conveying information in entity content, wherein the brand style guide includes data defining at least one branding strategy to manage applying the tone and mood to entity products for the entity, and wherein the set of computing devices generate the brand style guide by extracting entity brand attributes from each electronic entity identity resource in a set of electronic entity identity resources, wherein the entity brand attributes determine how content of the electronic identity resource is presented, automatically generating a set of proposed alterations to the extracted entity brand attributes or a set of additions for inclusion with the extracted entity brand attributes, wherein the set of proposed alterations and the set of additions have a role in contributing to the tone and mood used when conveying information, and generating the brand style guide for the entity using the extracted entity brand attributes and the set of proposed alterations to the extracted entity brand attributes or the set of additions for inclusion with the extracted entity brand attributes; and a set of computing devices configured to manage entity products for the entity using the brand style guide, wherein the managing includes enabling a third party user system to utilize data corresponding to the brand style guide and evaluating entity products for compliance with the brand style guide.

* * * * *